United States Patent
Mora et al.

(10) Patent No.: US 11,676,308 B2
(45) Date of Patent: **\*Jun. 13, 2023**

(54) METHOD FOR IMAGE PROCESSING AND APPARATUS FOR IMPLEMENTING THE SAME

(71) Applicant: ATEME, Velizy Villacoublay (FR)

(72) Inventors: Elie Mora, Paris (FR); Anthony Nasrallah, Puteaux (FR)

(73) Assignee: ATEME, Velizy Villacoublay (FR)

( * ) Notice: Subject to any disclaimer, the term of this patent is extended or adjusted under 35 U.S.C. 154(b) by 555 days.

This patent is subject to a terminal disclaimer.

(21) Appl. No.: 16/584,144

(22) Filed: Sep. 26, 2019

(65) Prior Publication Data

US 2020/0105022 A1    Apr. 2, 2020

(30) Foreign Application Priority Data

Sep. 27, 2018  (EP) ..................................... 18306269

(51) Int. Cl.
| | | |
|---|---|---|
| G06K 9/36 | (2006.01) | |
| G06K 9/46 | (2006.01) | |
| G06T 9/00 | (2006.01) | |
| H04N 19/11 | (2014.01) | |
| H04N 19/119 | (2014.01) | |

(Continued)

(52) U.S. Cl.
CPC ............... *G06T 9/00* (2013.01); *H04N 19/11* (2014.11); *H04N 19/119* (2014.11); *H04N 19/159* (2014.11); *H04N 19/176* (2014.11)

(58) Field of Classification Search
None
See application file for complete search history.

(56) References Cited

U.S. PATENT DOCUMENTS 8,559,512 B2 * 10/2013 Paz ...................... H04N 19/176
                                                    382/238
10,230,961 B2 * 3/2019 Liu ........................ H04N 19/11
(Continued)

FOREIGN PATENT DOCUMENTS

EP          2 375 750 A1     10/2011

OTHER PUBLICATIONS

Kau et al., "A Gradient Intensity-Adapted Algorithm With Adaptive Selection Strategy for the Fast Decision of H.264/AVC Intra-Prediction Modes," in IEEE Transactions on Circuits and Systems for Video Technology, vol. 25, No. 6, pp. 944-957, Jun. 2015, doi: 10.1109/TCSVT.2014.2369691. (Year: 2015).*

(Continued)

*Primary Examiner* — Feng Niu
(74) *Attorney, Agent, or Firm* — Faegre Drinker Biddle & Reath LLP

(57) ABSTRACT

A method of processing an image divided into a plurality of pixel blocks which are processed according to a processing sequence is provided, which comprises, for a current pixel block: determining an application area consisting of a set of pixels in blocks preceding the current block in the processing sequence, for each pixel of the application area, computing a gradient representing a directional change of an intensity at the pixel, and selecting, based on at least one of the computed gradients, an intra prediction video coding mode among a plurality of intra prediction video coding modes usable for encoding and/or decoding the current block.

20 Claims, 10 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 10,397,569 | B2* | 8/2019 | Liu | H04N 19/593 |
| 10,448,011 | B2* | 10/2019 | Liu | H04N 19/11 |
| 10,880,546 | B2* | 12/2020 | Yoo | H04N 19/159 |
| 10,917,660 | B2* | 2/2021 | Vanam | H04N 19/59 |
| 10,939,096 | B2* | 3/2021 | Xiu | H04N 19/105 |
| 10,951,884 | B2* | 3/2021 | Moon | H04N 19/124 |
| 11,039,148 | B2* | 6/2021 | Moon | H04N 19/139 |
| 11,109,024 | B2* | 8/2021 | Kotra | H04N 19/176 |
| 11,284,086 | B2* | 3/2022 | Kotra | H04N 19/124 |
| 11,418,816 | B2* | 8/2022 | Hanhart | H04N 19/513 |
| 11,451,768 | B2* | 9/2022 | Mora | G06F 17/16 |
| 2012/0269263 | A1* | 10/2012 | Bordes | H04N 19/129 375/E7.125 |
| 2016/0014421 | A1* | 1/2016 | Cote | H04N 19/124 382/170 |
| 2016/0373741 | A1* | 12/2016 | Zhao | H04N 19/70 |
| 2016/0373742 | A1* | 12/2016 | Zhao | H04N 19/136 |
| 2016/0373743 | A1* | 12/2016 | Zhao | H04N 19/182 |
| 2017/0272745 | A1* | 9/2017 | Liu | H04N 19/11 |
| 2017/0353719 | A1* | 12/2017 | Liu | H04N 19/156 |
| 2017/0353730 | A1* | 12/2017 | Liu | H04N 19/159 |
| 2017/0366807 | A1* | 12/2017 | Thoreau | H04N 19/11 |
| 2017/0374369 | A1* | 12/2017 | Chuang | H04N 19/593 |
| 2019/0104303 | A1* | 4/2019 | Xiu | H04N 19/463 |
| 2019/0166370 | A1* | 5/2019 | Xiu | H04N 19/176 |
| 2019/0215521 | A1* | 7/2019 | Chuang | H04N 19/139 |
| 2019/0335199 | A1* | 10/2019 | Joshi | H04N 19/12 |
| 2019/0373252 | A1* | 12/2019 | Moon | H04N 19/159 |
| 2019/0373285 | A1* | 12/2019 | Vanam | H04N 19/593 |
| 2019/0379891 | A1* | 12/2019 | Moon | H04N 19/44 |
| 2020/0045311 | A1* | 2/2020 | Yoo | H04N 19/159 |
| 2020/0145659 | A1* | 5/2020 | Kotra | H04N 19/96 |
| 2020/0145668 | A1* | 5/2020 | Kotra | H04N 19/119 |
| 2020/0260120 | A1* | 8/2020 | Hanhart | H04N 19/86 |
| 2020/0296356 | A1* | 9/2020 | Mora | G06N 7/005 |
| 2021/0152814 | A1* | 5/2021 | Moon | H04N 19/159 |
| 2021/0195238 | A1* | 6/2021 | Moon | H04N 19/167 |
| 2021/0281853 | A1* | 9/2021 | Moon | H04N 19/105 |
| 2021/0281854 | A1* | 9/2021 | Moon | H04N 19/159 |
| 2022/0159238 | A1* | 5/2022 | Moon | H04N 19/117 |

OTHER PUBLICATIONS

Xiu et al., "Decoder-side intra mode derivation for block-based video coding," 2016 Picture Coding Symposium (PCS), 2016, pp. 1-5, doi: 10.1109/PCS.2016.7906340. (Year: 2016).*

Huang et al., "Efficient intra prediction based on line with adaptive gradient detection for high definition videos," 2012 3rd IEEE International Conference on Network Infrastructure and Digital Content, 2012, pp. 406-410, doi: 10.1109/ICNIDC.2012.6418784. (Year: 2012).*

Bross et al., "High efficiency video coding (HEVC) text specification draft 7", JCTVC-I1003, Joint Collaborative Team on Video Coding (JCT-VC) of ITU-T SG16 WP3 and ISO/IEC JTC1/SC29/WG11, 9th Meeting, Geneva, CH, Apr. 27-May 7, 2012, 280 pages.

Chen et al., "Algorithm Description of Joint Exploration Test Model 7 (JEM 7)", JVET-G1001, Joint Video Exploration Team (JVET) of ITU-T SG 16 WP 3 and ISO/IEC JTC 1/SC 29/WG 11, 7th Meeting, Torino, IT, Jul. 13-21, 2017, 50 pages.

Cisco Corp., "Cisco Visual Networking Index: Global Mobile Data Traffic Forecast Update, 2017-2022," White Paper, 2017, updated Feb. 2019, downloaded from Internet website: https://www.cisco.com/c/en/us/solutions/collateral/service-provider/visual-networking-index-vni/white-paper-c11-738429.html on Sep. 26, 2019, 33 pages.

Mora et al., "CE3-related: Decoder-side Intra Mode Derivation," JVET-L0164, Joint Video Experts Team (JVET) of ITU-T SG 16 WP 3 and ISO/IEC JTC 1/SC 29/WG 11, 12th Meeting, Macao, CN, Oct. 3-12, 2018, retrieved from Internet website: http://phenix.int-evry.fr/mpeg/doc end user/documents/124 Macao/wg11/m44184-JVET L0164-v1-JVET-L0164.zip JVET-L0164.docx on Sep. 24, 2018, 8 pages.

Pan et al., "Fast Mode Decision Algorithm for Intraprediction in H.264/AVC Video Coding," IEEE Transactions on Circuits and Systems for Video Technology, Institute of Electrical and Electronics Engineers, US, Jul. 2005, vol. 15, No. 7, pp. 813-822.

Su et al., "An Optimized Template Matching Approach to Intra Coding in Video/Image Compression," Proceedings of SPIE-IS&T Electronic Imaging, SPIE-IS&T, 2014, vol. 9029, 6 pages.

Xiu et al., "EE8: Decoder-side intra mode derivation," JVET-D0097, Joint Video Exploration Team (JVET) of ITU-T SG 16 WP 3 and ISO/IEC JTC 1/SC 29/WG 11, 4th Meeting, Chengdu, CN, Oct. 15-21, 2016, 22 pages.

Search Report issued in related application EP 18306269.4, dated Apr. 1, 2019, 10 pages.

* cited by examiner

1. ☐ Current pixel
2. ▨ Neighbor pixel
3. ⌐ Application area

METHOD FOR IMAGE PROCESSING AND APPARATUS FOR IMPLEMENTING THE SAME

CROSS-REFERENCE TO RELATED APPLICATION

This application claims priority benefit under 35 U.S.C. § 119(d) from European Patent Application No. 18306269.4, filed Sep. 27, 2018, the disclosure of which is incorporated by reference herein in its entirety.

FIELD

The present disclosure relates to the field of image encoding, in particular for video stream compression.

BACKGROUND

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

In known video coding or compression schemes, images (also referred to as "frames") of an input video stream to be encoded are typically processed according to an image encoding sequence, and each image is divided into pixel sets (also referred to as, depending on the scheme, "blocks" or "coding unit") which are also processed sequentially, for example starting from the set located in the upper left corner of the image, and ending with the set located in the lower right corner of the image.

The encoding of an image of an input video stream may therefore involve dividing a pixel matrix corresponding to the image into several pixel sets, for example into blocks of a fixed size (16×16 pixels, 32×32 pixels, or 64×64 pixels), and encoding these pixel blocks according to a predefined encoding sequence. In some standards, such as H.264/AVC, blocks smaller than 16×16 pixels may be defined (for example of size 8×8 pixels or 4×4 pixels) so as to perform encoding of the image with a finer granularity.

Conventional video compression schemes can be classified into two main categories: an intra prediction video coding category on the one hand, and an inter prediction video coding category on the other hand. In intra prediction video coding, also referred to as spatial prediction video coding, the compression processing uses for the prediction spatial redundancies based on pixels of the current image or video frame, while in inter prediction video coding, also referred to as temporal prediction video coding, the compression processing uses for the prediction temporal redundancies based on pixels of several images or video frames (previously encoded and reconstructed video frames, which may correspond to previous and/or future frames with respect to a current frame in an input video sequence). More specifically, in intra prediction video coding, the processing of a pixel block (or set of pixels) typically includes a prediction of the pixels of the block based on reconstructed pixels that have been previously encoded (also called "causal pixels") in the image currently being encoded (which may be referred to as "current image"). In inter prediction video coding, the processing of a pixel block typically includes a prediction of the pixels of the block based on pixels of one or more previously encoded images.

Exploiting the spatial redundancies (for intra prediction video coding) and/or time redundancies (for inter prediction video coding) is therefore performed to avoid transmitting or storing the pixel values of each pixel block (or set of pixels), and at least some of the blocks of each encoded image in a video stream is represented by a pixel residual that corresponds to the difference (or the distance) between prediction values and true values for the pixels of the predicted block. Information related to pixel residual is inserted in the encoded data generated by a video encoder after transform (e.g. Discrete Cosinus Transform, DCT) and quantization so as to reduce the entropy of data generated by the encoder.

In 2013, the video compression standard High Efficiency Video Coding (HEVC)/H.265 reached Final Draft International Standard (FDIS) status. This standard was developed by the Joint Collaborative Team on Video Coding (JCT-VC), a collaboration between two standardization bodies ISO/IEC MPEG and ITU-T VCEG. HEVC is the successor of the H.264/AVC (Advance Video Coding) standard, which is widely used nowadays (around 90% videos are still coded with AVC). HEVC brings improvements compared to AVC, offering double the data compression ratio at the same level of video quality, or substantially improved video quality at the same bit rate.

The visualization of video content has been revolutionized in the last few years with the emergence of video-on-demand services like YouTube, Netflix, Hulu, etc. web-TV, video-sharing sites, social networks like Facebook, Instagram, Snapchat etc., or live video streaming service for individuals. All of the above-mentioned services are rapidly increasing the internet video traffic. In addition, video data is getting larger and there is a constant need to compress it, but without significantly degrading the quality of the video. Some research predicts that by the year 2021, the video traffic will increase by 4 times since 2016 and the amount of data will probably represent around 81% of all internet traffic. New technologies like 360° videos, Virtual Reality, HD videos, UHD videos, 4K, 8K or 16K videos yield significantly more data to transmit.

As a result, a Joint Video Experts Team (JVET)—a collaborative team formed by the same standardization bodies MPEG and VCEG—has been created with an aim to develop a new video coding standard to be known as Versatile Video Coding—VVC/H.266. The primary objective of this new codec is to provide a significant improvement in compression performance over HEVC. The VVC standard is scheduled to be released in 2021 and by then, the aim is not just to lower the bitrate at the same video quality, but also to develop a codec which would aid the deployment of higher quality video services and emerging applications such as 360° omnidirectional immersive multimedia and High Dynamic Range (HDR) video.

In conventional encoding standards using prediction coding, additional information is generated by pixel prediction. Its corresponding data (also called prediction information) is inserted in the output data generated by the encoder. In the intra coding mode, the intra prediction mode defining how the prediction of the current block is performed using neighboring samples (which may be referred to as "reference samples"), is an example of such prediction information. For intra prediction coding, an estimate of between 4% and 15% of the bit stream at the output of a video encoder may correspond to data to be provided to a decoder for information related to pixel prediction used to encode the input video stream. Therefore it is desirable to improve the efficiency of video encoding/compression by decreasing the amount of data generated at the output of the decoder and corresponding to pixel prediction information (such as, for example, intra prediction modes, or motion vectors).

There is therefore a need for providing an improved video processing scheme and video encoder and/or decoder implementing the same that address at least some of the above-described drawbacks and shortcomings of the conventional technology in the art.

SUMMARY

It is an object of the present subject disclosure to provide an improved video processing scheme and apparatus implementing the same.

Another object of the present subject disclosure is to provide an improved video encoding or compression and/or video decoding or decompression scheme and apparatuses implementing the same.

Another object of the present subject disclosure is to provide an improved video encoding and/or decoding scheme and apparatuses implementing the same for alleviating the above-described drawbacks and shortcomings of conventional prediction-based video encoding/decoding schemes, in particular video encoding/decoding schemes using intra prediction encoding of pixel blocks of images of an input video stream to be encoded.

To achieve these objects and other advantages and in accordance with the purpose of the present subject disclosure, as embodied and broadly described herein, in one aspect of the present subject disclosure, a method of processing an image, a digital video frame, or more generally digital video data, divided into a plurality of pixel blocks which are processed according to a processing sequence is proposed. The method comprises, for a current pixel block: determining an application area comprising a set of pixels in blocks preceding the current block in the processing sequence; performing a gradient analysis on at least one pixel of the application area; selecting, based on results of the gradient analysis, an intra prediction video coding mode among a plurality of intra prediction video coding modes usable for encoding and/or decoding the current block.

In some embodiments, the performing the gradient analysis comprises: for at least one pixel of the application area, computing a gradient representing a directional change of an intensity at the pixel, and wherein the selecting is based on at least one of the computed gradients. In embodiments, the computation of a gradient may be performed for each pixel of the application area.

In some embodiments, the proposed method may be performed by a processor of an image encoder, and further comprise, at the image encoder: encoding, via the processor, the current block according to the selected intra prediction video coding mode.

In other embodiments, the proposed method may be performed by a processor of an image decoder, and further comprise, at the image decoder: decoding, via the processor, the current block according to the selected intra prediction video coding mode.

In some embodiments, the plurality of intra prediction video coding modes is used at the image encoder for encoding the current block, and is used at the decoder for decoding the current block.

In some embodiments, the performing the gradient analysis further comprises: computing a first gradient value representing an estimate magnitude of the directional change of the intensity at the at least one pixel, and a second gradient value representing an estimate orientation of the directional change of the intensity at the at least one pixel.

In some embodiment, the performing the gradient analysis comprises: generating respective estimates of derivatives of an intensity level at the at least one pixel in the horizontal and vertical directions by performing a convolution of a source matrix of pixels of the image with horizontal and vertical filter matrices, respectively.

In some embodiments, the selecting the intra prediction video coding mode comprises: for the at least one pixel of the application area, mapping the computed gradient to an intra prediction mode among the plurality of intra prediction video coding modes.

In some embodiments, the mapping is performed by mapping the second gradient value to a directional intra prediction mode among the plurality of intra prediction video coding modes.

In some embodiments, the selecting the intra prediction video coding mode further comprises: determining respective weight values for several intra prediction modes among the plurality of intra prediction video coding modes, based on gradients computed for pixels of the application area.

In some embodiments, the weight value for an intra prediction video coding mode is determined based on the one or more computed gradient mapped to the intra prediction video coding mode.

In some embodiments, the weight value for an intra prediction video coding mode is determined by combining respective first gradient values of computed gradients mapped to the intra prediction video coding mode.

In some embodiments, the intra prediction video coding mode is selected based on its weight value.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to process an image divided into a plurality of pixel blocks which are processed according to a processing sequence, by performing, for a current block, the determining, via the processor, of an application area comprising a set of pixels in blocks preceding the current block in the processing sequence, the performing, via the processor, a gradient analysis on at least one pixel of the application area, and the selecting, via the processor, based on results of the gradient analysis, an intra prediction video coding mode among a plurality of intra prediction video coding modes usable for encoding and/or decoding the current block.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

In yet another aspect of the present subject disclosure, a method of processing an image divided into a plurality of pixel blocks which are processed according to a processing sequence is proposed, which comprises, for a current pixel block: determine, via a processor of an image processing system, an application area consisting of a set of pixels in blocks preceding the current block in the processing sequence; for each pixel of the application area, computing, via the processor, a gradient representing a directional change of an intensity at the pixel; selecting, via the processor, based on at least one of the computed gradients, an intra prediction video coding mode among a plurality of intra prediction video coding modes usable for encoding or decoding the current block.

In yet another aspect of the present subject disclosure, a method of processing an image divided into a plurality of pixel blocks which are processed according to a processing sequence is proposed, which comprises, for a current pixel block: determining, via a processor of an image processing system, an application area comprising a set of pixels in blocks preceding the current block in the processing sequence; performing, via the processor, a gradient analysis on at least one pixel of the application area; selecting, via the processor, based on results of the gradient analysis, an intra prediction video coding mode among a plurality of intra prediction video coding modes usable for encoding and/or decoding the current block.

In yet another aspect of the present subject disclosure, a method of processing an image divided into a plurality of pixel blocks which are processed according to a processing sequence is proposed, which comprises, for a current pixel block: determining, via a processor of an image processing system, an application area comprising a set of pixels in blocks preceding the current block in the processing sequence; performing, via the processor, a gradient analysis on at least one pixel of the application area; selecting, via the processor, based on results of the gradient analysis, a spatial prediction video coding mode among a plurality of spatial prediction video coding modes usable for encoding and/or decoding the current block.

In yet another aspect of the present subject disclosure, a method of processing an image divided into a plurality of pixel blocks which are processed according to a processing sequence is proposed, which comprises, for a current pixel block: determining, via a processor of an image processing system, an application area as a set of causal pixels; performing, via the processor, a gradient analysis on at least one pixel of the application area; selecting, via the processor, based on results of the gradient analysis, a spatial prediction video coding mode among a plurality of spatial prediction video coding modes usable for encoding and/or decoding the current block.

In yet another aspect of the present subject disclosure, a method of processing an image divided into a plurality of pixel blocks which are processed according to a processing sequence is proposed, which comprises, for a current pixel block: determining an application area comprising a set of pixels in blocks preceding the current block in the processing sequence; performing a gradient analysis on at least one pixel of the application area; selecting, based on results of the gradient analysis, an intra prediction video coding mode among a plurality of intra prediction video coding modes usable for encoding and/or decoding the current block.

It should be appreciated that the present disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIGS. 2*a*-2*e* illustrate exemplary intra prediction modes, to which the proposed method may be applied in accordance with one or more embodiments;

DETAILED DESCRIPTION

Figure 1:
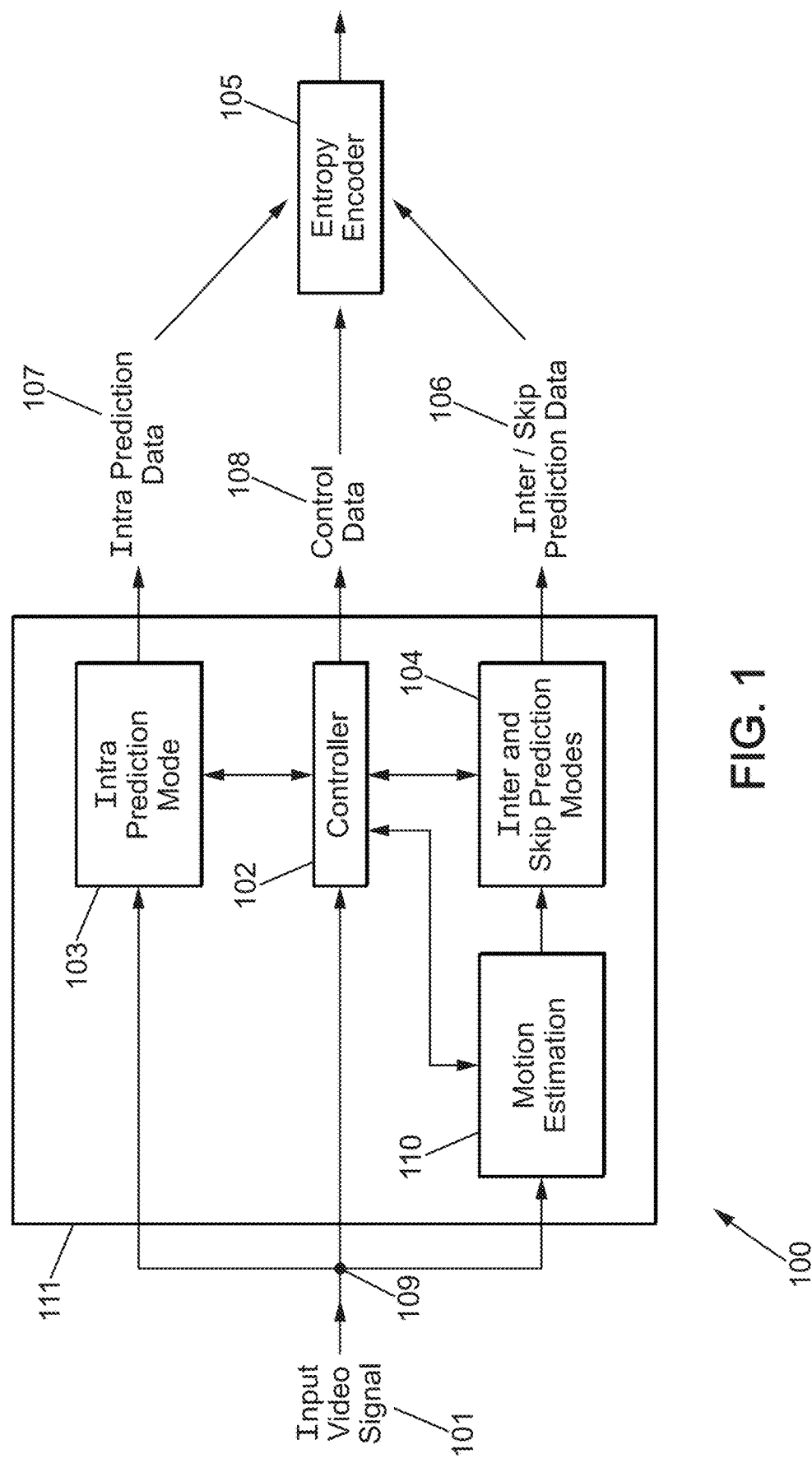
FIG. 1 is a block diagram illustrating an exemplary video encoder on which the proposed method may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the disclosure. Additionally, elements in the drawing figures are not necessarily drawn to scale. For example, the dimensions of some of the elements in the figures may be exaggerated relative to other elements to help improve understanding of embodiments of the present disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

The proposed process may be implemented by any video encoder, video decoder, or video codec configured for encoding and/or decoding images (or frames) of input video data using predictive coding exploiting spatial redundancies of pixel blocks in images of the input video data (e.g. intra prediction video coding), such as, for example a video encoder and/or decoder compliant with the any of the H.261, MPEG-1 Part 2, H.262, MPEG-2 Part 2, H.264/AVC, H.265/HEVC, MPEG-4 Part 2 and SHVC (Scalable HEVC) standards.

Shown on FIG. 1 is a video encoder 100 that receives at input 109 an input video stream 101 that includes a plurality of images (or frames) to be processed for the encoding of the input video stream. The video encoder includes a controller 102, operatively coupled with the input interface 109, configured for controlling the operations of a motion estimation unit 110 and an inter prediction encoding unit 104, as well as an intra prediction encoding unit 103. Data received on the input interface 109 are transmitted to the motion estimation unit 110, to the inter prediction encoding unit 104, to the intra prediction encoding unit 103, and to the controller 102. Together with the controller 102, the motion estimation unit 110, the inter prediction encoding unit 104, and the intra prediction encoding unit 103 form an encoding unit 111 which is operatively coupled to the input interface 109.

The intra prediction encoding unit 103 generates intra prediction data 107 which are inputted to an entropy encoder 105. The motion estimation unit 110 generates motion estimation data 106 which are provided to the controller 102 as well as to the inter prediction encoding unit 104 for inter prediction encoding. The inter prediction encoding unit 104 generates inter prediction data which are inputted to the entropy encoder 105. For example, in some embodiments, data provided to the decoder for an inter prediction encoding may include pixel residuals and information related to one or more motion vectors. Such information related to one or more motion vectors may include one or more indices that each identifies a prediction vector in a list of prediction vectors known to the decoder. Data provided to the decoder for a skip prediction mode may typically not include any pixel residual, and may also include one or more indices that each identifies a prediction vector in a list of prediction vectors known to the decoder. The list of prediction vector used for inter prediction encoding may not be identical to the list of prediction vectors used for skip prediction encoding.

The controller 102 generates control data which may also be provided as input data to the entropy encoder 105.

In one or more embodiments, an image undergoing processing is typically divided into blocks or coding units, the form and size of which may be determined based on the size of the pixel matrix that corresponds to the image, for example into square-shaped macroblocks of size 16×16 pixels. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

One may therefore consider a so-called "current block," that is, a block being under processing in the current image. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction type may be used, such as an intra prediction, an inter prediction, and/or a skip prediction, implemented in the encoder, the prediction of the block pixels typically includes a selection of a prediction type, and the generation of prediction data that correspond to the selected prediction type, which may form, together with prediction type selection data, a set of encoding parameters.

A video encoder using prediction coding, whether it is spatial prediction coding (e.g. intra prediction) or temporal prediction coding (e.g. inter or skip prediction), will typically include a decoder unit, or pixel reconstruction unit (not represented on FIG. 1), configured for generating reconstructed pixels, from the reconstructing of pixels that have been encoded, which reconstructed pixels are used for the prediction of pixels of a current block (i.e. pixels of a block being encoded).

In some embodiments, the prediction of the block under processing may comprise a calculation of pixel residuals, which respectively correspond to a gap, or distance, or difference, between pixels of the current block and corresponding pixels of a prediction block. The pixel residuals may be transmitted to the decoder in some embodiments after transform and quantization.

Different encoding modes may therefore be available for the encoding of a current block, so that encoding information 106-108 may be included in the data generated by the encoder further to the encoding of the current block. Such encoding information may for example comprise information on a coding mode (e.g. information indicating the type of prediction, among intra, inter, and skip, or among intra and inter) used for encoding the current block, information on the partitioning of the current block into sub-blocks, as the case may be, motion estimation information in the case of a prediction of the inter or skip type, and/or intra prediction mode information 107 in the case of a prediction of the intra type.

Examples of intra prediction modes are described hereinafter in order to assist the understanding of the proposed method according to the present subject disclosure.

As discussed above intra prediction encoding of a current image typically involves predicting pixels of a block (or set) of pixels undergoing processing using previously encoded pixels in the current image. Different intra prediction modes may be used, of which some are described in the following:

In the so-called "Discrete Continuous" (DC) intra prediction mode, values of neighboring pixels of the current block that belong to previously encoded blocks are used to calculate a mean value of these neighboring pixel values. The prediction block is then built using for each pixel the calculated mean value.

Figures 2A, 2B:
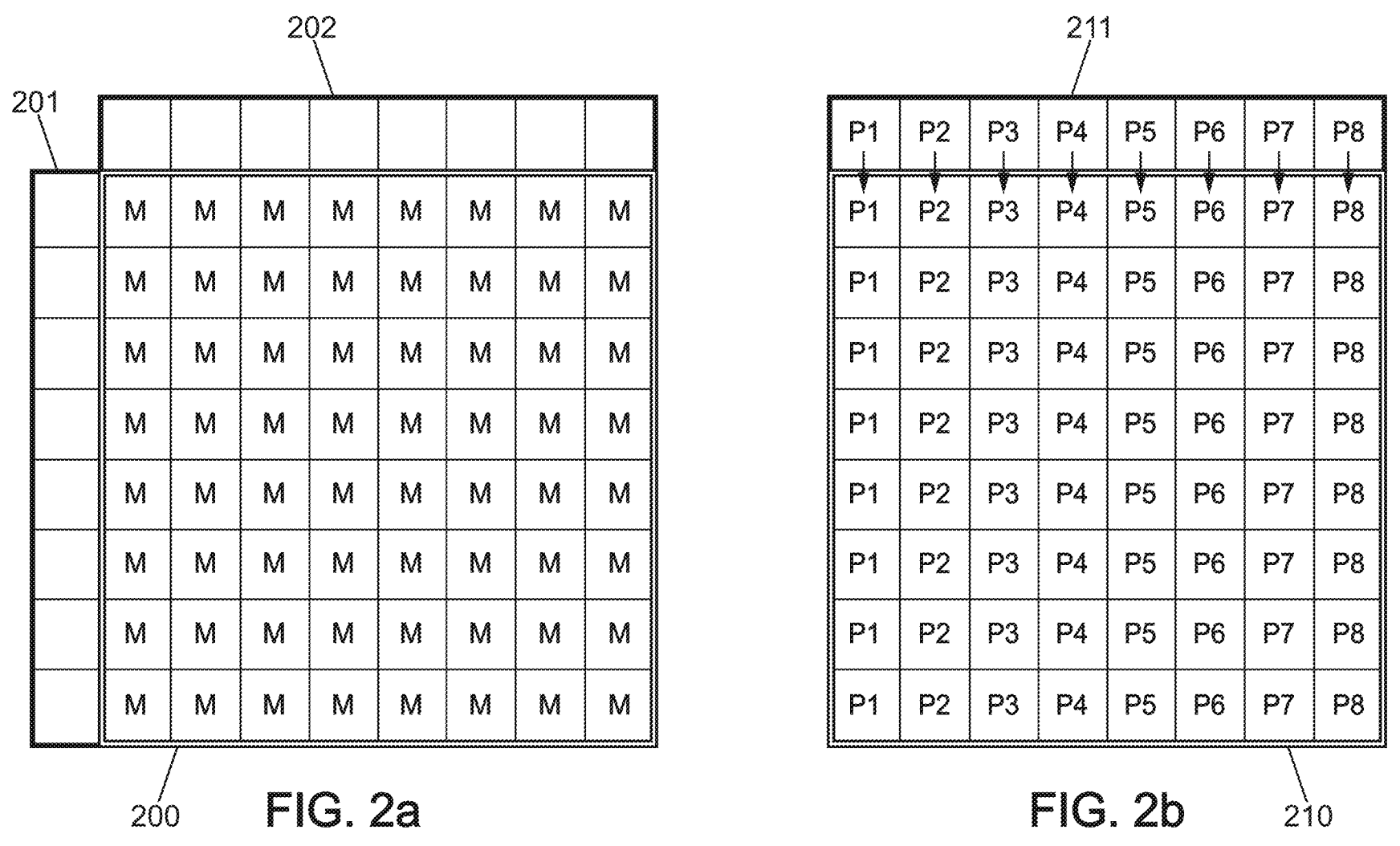

For example, for a prediction block 200 of 8×8 pixels as that illustrated on FIG. 2a, two sets of 8 neighboring pixels 201, 202 that respectively belong to the neighboring block located on the left of the current block and to the neighboring block located above the current block, may be used to calculate a mean value M of the values of these 16 pixels. The calculated mean value is used to fill the pixels of the prediction block 200, that is, the calculated mean value M is assigned as value of each of the pixels of the prediction block 200.

In the so-called "Vertical" (V) intra prediction mode, values of previously encoded neighboring pixels located above the current block are used, and each pixel of the prediction block is assigned the value of the neighboring pixel located in the same column.

For example, for a block 210 of 8×8 pixels as that illustrated on FIG. 2b, the set of 8 neighboring pixels 211 that belong to the neighboring block located immediately above the current block, may be used to fill the pixels of the prediction block 210, assuming that the 8 neighboring pixels 211 have been previously encoded. As shown on FIG. 2b, each pixel of the prediction block 210 takes the value of the one of the 8 neighboring pixels 211 located in the same column as the pixel, and the 8 neighboring pixels 211 are distributed in the prediction block 200 according to a vertical prediction direction.

In the so-called "Horizontal" (H) intra prediction mode, values of previously encoded neighboring pixels located on the left of the current block are used, and each pixel of the prediction block is assigned the value of the neighboring pixel located on the same line as the pixel.

Figures 2C, 2D:
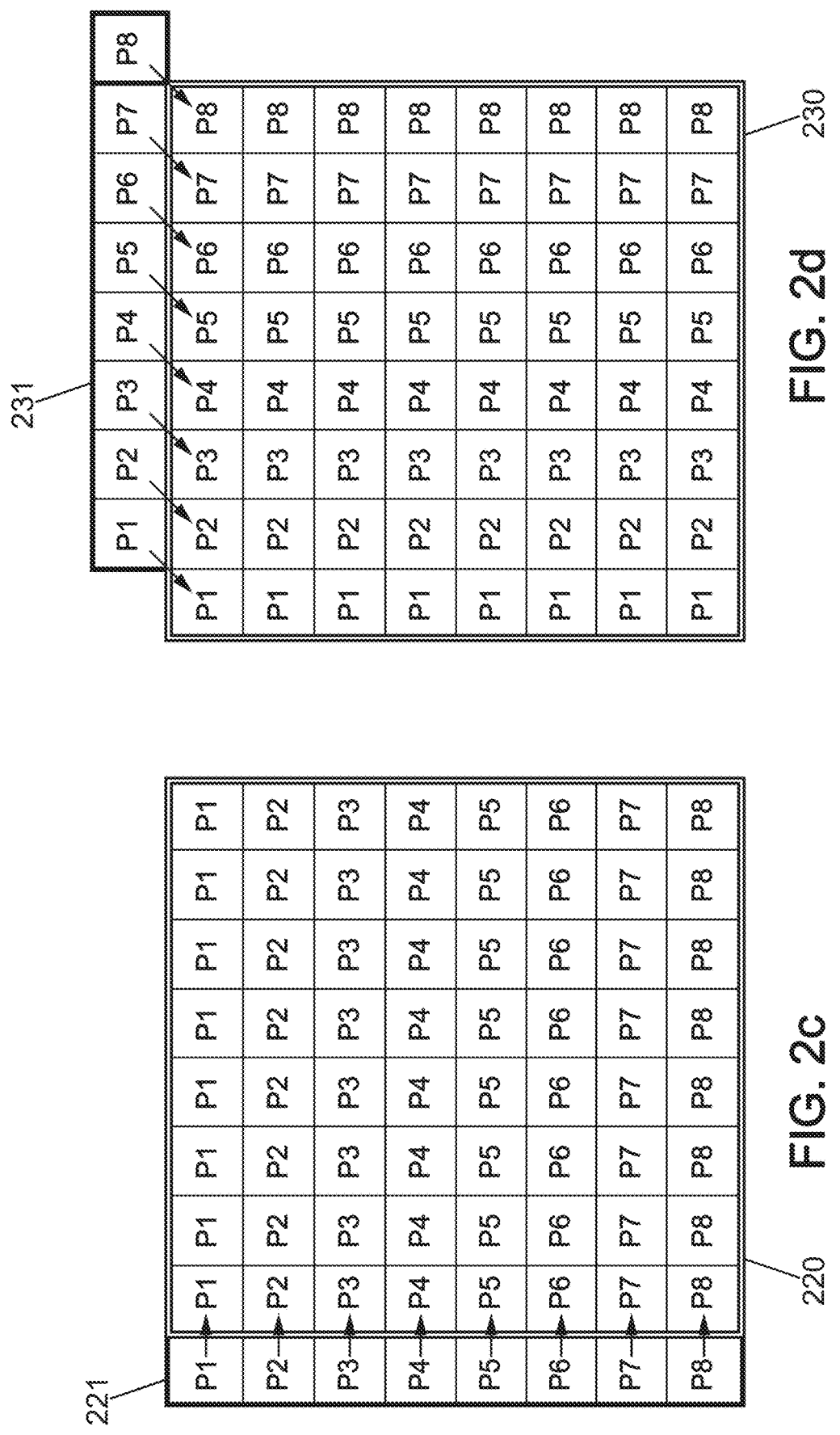

For example, for a block 220 of 8×8 pixels as that illustrated on FIG. 2c, the set of 8 neighboring pixels 221 that belong to the neighboring block located on the left of the current block, may be used to fill the pixels of the prediction block 220, assuming that the 8 neighboring pixels 221 have been previously encoded. As shown on FIG. 2c, each pixel of the prediction block 220 takes the value of the one of the 8 neighboring pixels 221 located on the same line as the pixel, and the 8 neighboring pixels 221 are distributed in the prediction block 220 according to a horizontal prediction direction.

In the so-called "Vertical-Left" (VL) intra prediction mode, values of previously encoded neighboring pixels located above the current block with a one-pixel shift to the right as compared to a line of pixels of the current block are used, and each pixel of the prediction block is assigned the value of the neighboring pixel located above with a one-pixel shift to the right from the pixel of the block located on the upper line of the block and on the same column as the pixel.

For example, for a block 230 of 8×8 pixels as that illustrated on FIG. 2d, the set of 8 neighboring pixels 231 located above the current block 230 with a one-pixel shift to the right as compared to a line of pixels of the current block 230, may be used to fill the pixels of the prediction block 230, assuming that the 8 neighboring pixels 231 have been previously encoded. As shown on FIG. 2d, each pixel 232a of the prediction block 230 takes the value of the one 232b of the 8 neighboring pixels 231 located above with a one-pixel shift to the right from the pixel 232c of the block located on the upper line of the block and on the same column as the pixel 232a, and the 8 neighboring pixels 231 are distributed in the prediction block 230 according to a vertical left prediction direction.

In the so-called "Vertical-Right" (VR) intra prediction mode, values of previously encoded neighboring pixels located above the current block with a one-pixel shift to the left as compared to a line of pixels of the current block are used, and each pixel of the prediction block is assigned the value of the neighboring pixel located above with a one-pixel shift to the left from the pixel of the block located on the upper line of the block and on the same column as the pixel.

Figure 2E:
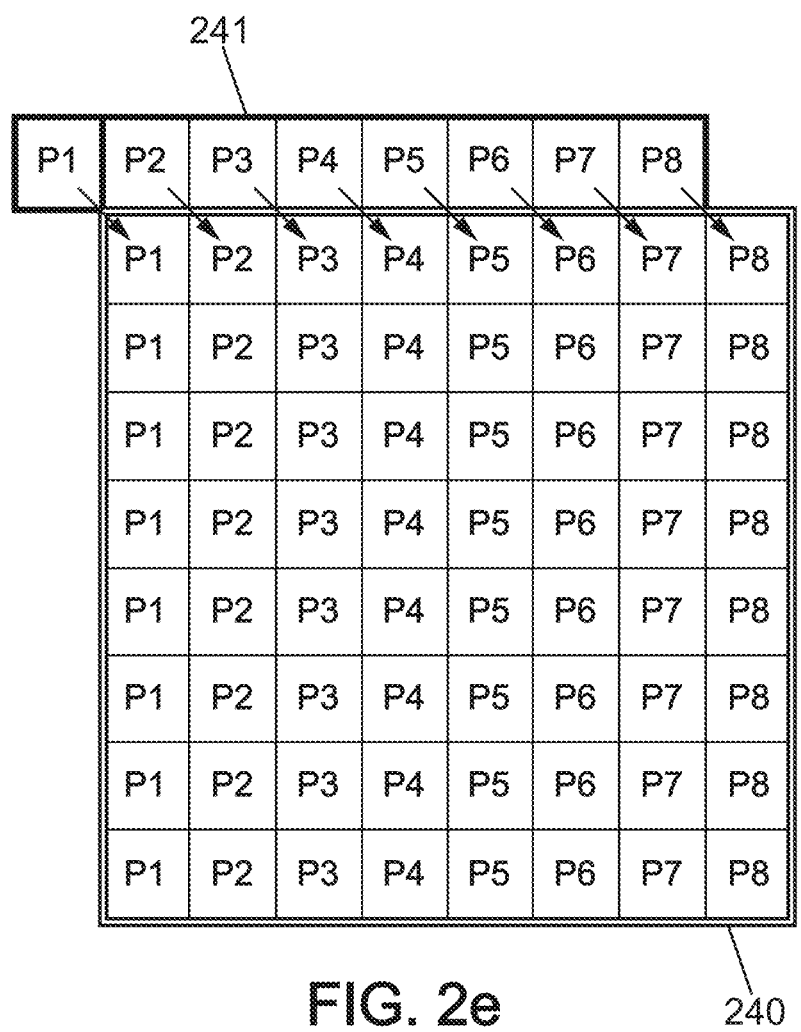

For example, for a block 240 of 8×8 pixels as that illustrated on FIG. 2e, the set of 8 neighboring pixels 241 located above the current block 240 with a one-pixel shift to the left as compared to a line of pixels of the current block 240, may be used to fill the pixels of the prediction block 240, assuming that the 8 neighboring pixels 241 have been previously encoded. As shown on FIG. 2e, each pixel 242a of the prediction block 240 takes the value of the one 242b of the 8 neighboring pixels 241 located above with a one-pixel shift to the left from the pixel 242c of the block located on the upper line of the block and on the same column as the pixel 242a, and the 8 neighboring pixels 241 are distributed in the prediction block 240 according to a vertical right prediction direction.

Nine intra prediction modes have been specified for the H.264/MPEG-4 AVC video coding standard (including the above-described DC, H, V, VL, VR, HL, and HR intra prediction modes), including a DC prediction mode and 8 directional modes. The HEVC video coding standard supports 35 intra prediction modes, including a planar prediction mode, a DC prediction mode, and 33 directional modes.

Information on the selected intra prediction mode may also be predicted so as to reduce its coding cost. Indeed, the cost of transmission in the encoded data stream of an index identifying the selected intra prediction mode would otherwise increase with the number of supported intra prediction modes. Even in the case of the H.264/MPEG-4 AVC video coding standard, transmitting an index $i \in \{1; 2; 3; 4; 5; 6; 7; 8; 9\}$ that identifies for each block encoded with intra prediction the selected mode among the 9 intra prediction modes supported by the standard is generally considered too costly in terms of coding cost.

To this end, a "most probable mode" (MPM) may be determined, and encoded using the lowest possible number of bits to be transmitted to the decoder. The MPM is generated by predicting the intra prediction mode used to encode the current block. As a consequence, in cases where the current block is encoded with intra prediction, only pixel residual information and MPM information may be included in the bitstream generated by the encoder to be transmitted to the decoder after quantization and entropy coding.

However, even though the MPM may be used to lower the coding cost of information related to the selected intra prediction mode, an estimated 4% to 15% of the total bitstream generated at the output of an HEVC encoder corresponds to prediction mode information necessary for the decoding of the encoded video data. It is therefore desirable to decrease such proportion of control information in the bitstream generated at the output of the encoder, in particular for applications which require the transmission, including wireless transmission, of such control information as included in the encoded bitstream, to the decoder.

Figure 3:
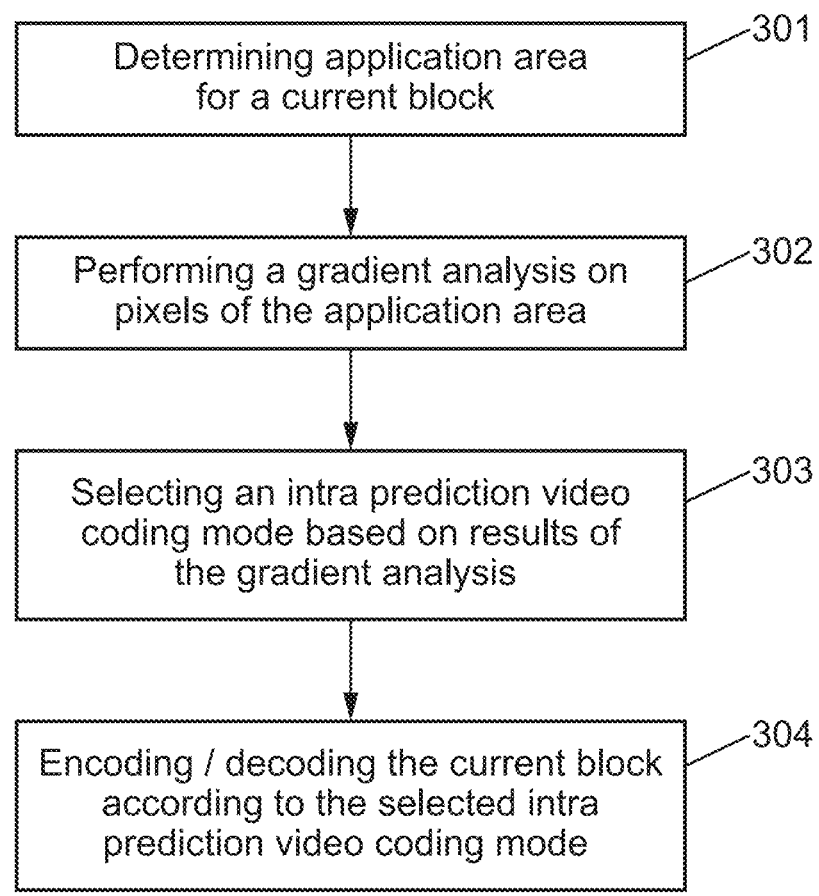
FIG. 3 is a block diagram illustrating an exemplary video processing method in accordance with one or more embodiments.

FIG. 3 is a block schematic diagram of a method of processing an image according to embodiments of the present subject disclosure.

As discussed above, the image in some embodiments may be divided into a plurality of pixel blocks, which may or may not be of equal size or of same shape, for purposes of encoding the image through encoding of the blocks according to a processing sequence.

The pixel blocks of the image may each be any set of pixels of the image, and may be chosen so that the set of blocks forms a partition of the image, that is, each pixel of the image belongs to only one block.

In the H.264/MPEG-4 AVC standard, a picture may be divided into so-called "macroblocks" of 16×16 pixels. Each macroblock can be split into multiple blocks depending on the coding mode selected at the macroblock level. In intra, a macroblock can be split into four 8×8 blocks, or sixteen 4×4 blocks.

In HEVC, a picture may be divided into so-called Coding Tree Units (CTU). The size of the CTU is fixed for an entire sequence, and is signaled in the Sequence Parameter Set (SPS). It can vary between 8×8 and 64×64. Each CTU can later be split into 4 Coding Units (CU), and each CU can be further split into 4 smaller CUs, and so on, until a maximum CU depth is reached (CU size varies between 8×8 and 64×64).

The pixel values of each block may correspond, depending on the block, to luma sample values, or to chroma sample values. For example, the H.264/MPEG-4 AVC video coding standard uses so-called "macroblocks", each macroblock comprising a 16×16 block of luma samples, and two corresponding 8×8 blocks of chroma samples for 4:2:0 color sampling.

The processing sequence for processing, at the encoder or at the decoder, the blocks of the image may define a sequence according to which blocks are encoded one after another. Because the blocks of the image may be encoded at the encoder according to a predetermined sequence, the encoded blocks may be decoded at the decoder according to the same processing sequence. For example, a raster scan sequence may scan the blocks of the image starting from the block located at the leftmost upper corner of the image (represented by a pixel matrix), and progress to the block adjacent to the previously scanned block located to the right. At the end of a line of block, the sequence proceeds to the next line scanning the blocks from the left to the right. Blocks sub-divided into sub-blocks may be scanned in the same manner.

In one or more embodiments, for a current pixel block being encoded, a so-called "application area," comprising a set of pixels in blocks preceding the current block in the processing sequence, is determined (301). In some embodiments, the application area may be a set of pixels in blocks preceding the current block in the processing sequence.

Then a gradient analysis may be performed (302) on at least one pixel of the application area. Depending on the embodiment, the gradient analysis may be performed on one or several pixels of the application area, or each pixel of the application area.

In one or more embodiments, the gradient analysis may comprise the computing of a gradient for one or several, or depending on the embodiment, each pixel of the application area. In some embodiments, the computed gradient may represent a directional intensity change at the pixel. In some embodiments, the gradient may be computed as part of an edge detection processing performed, at the encoder side and/or, at the decoder side, on decoded or reconstructed pixels, according to one or several edge detection algorithms.

An intra prediction video coding mode may be selected (303), among a plurality of intra prediction video coding modes for encoding the current block, based on the gradient analysis. In some embodiments, the intra prediction video coding mode may be selected based on at least one of the computed gradients. Because each of the computed gradients provides information on an edge orientation at the corresponding pixel, the plurality of intra prediction video coding modes may in some embodiments be chosen to correspond to the directional intra prediction video coding modes supported by the encoder for encoding the current block, and by the decoder for decoding the encoded pixels of the block. For example, in the case of an H.264/MPEG-4

AVC video codec, an intra prediction video coding mode may be selected among the 9 intra prediction modes supported by the AVC codec, based on at least one of the computed gradients. In the exemplary case of a HEVC video codec, an intra prediction video coding mode may be selected among the 35 intra prediction modes supported by the HEVC codec, based on at least one of the computed gradients.

The current block may then be processed (304) that is, encoded at the encoder side, or decoded at the decoder side, according to the selected intra prediction video coding mode.

The proposed process may advantageously alleviate the need to transmit to the decoder information related to the intra prediction video coding mode used for encoding the current block, as the determination of an application area, the gradient analysis performed on the application area (in embodiments the computing of a gradient for each pixel of the application area), and the selection of an intra prediction video coding mode based on the gradient analysis (in embodiments based on at least one of the computed gradients) may be performed at the decoder in an autonomous manner, that is, without the need for any data related to the intra prediction video coding mode selection performed at the encoder.

Therefore, an encoder configured for performing the proposed method may be configured for selecting an intra prediction video coding mode among a plurality of available intra prediction video coding modes, for encoding a current block, based on a gradient analysis performed at the encoder on its determined application area, and a decoder configured for performing the proposed method may be capable of selecting the same intra prediction video coding mode among the plurality of available intra prediction video coding modes, for decoding the current block, based on its own gradient analysis performed at the decoder on its determined application area, thereby alleviating the need for said decoder to receive information specifying the intra prediction video coding mode used at the encoder for encoding the current block.

In order to ensure that the encoder and decoder select the same intra prediction mode, the encoder and the decoder may be configured in some embodiments to determine the same application area, in correspondence with the same current block, that is, at the encoder, a set of pixels to be encoded, and at the decoder, the same set of pixels in the pixel matrix corresponding to the image, to be decoded.

The present subject disclosure therefore advantageously provides a method for autonomously selecting, at the encoder and at the decoder, an intra prediction video coding mode, thereby eliminating the need to include in the bitstream generated by the encoder information related to the intra prediction video coding mode used for coding a current block of an image. This results in an improvement in the compression efficiency for a given bitrate, or in a decrease of the bitrate at the output of the encoder.

Referring again to FIG. 3, in one or more embodiments, a decoder configured for performing a method according to the present subject disclosure may be configured, for a processing comprising a decoding of an image divided into a plurality of pixel blocks, the decoder being configured for decoding the image by sequentially decoding the pixel blocks according to a processing sequence to determine for a current pixel block an application area consisting of a set of pixels in blocks preceding the current block in the processing sequence, perform a gradient analysis on at least one pixel of the application area, and to select, based on results of the gradient analysis, an intra prediction video coding mode among a plurality of intra prediction video coding modes usable for encoding the current block. In some embodiments, the decoder may be configured to compute for one or more pixels, or depending on the embodiment, each pixel of the application area, a gradient representing an edge intensity level and an edge orientation at the pixel, and to select, based on at least one of the computed gradients, an intra prediction video coding mode among a plurality of intra prediction video coding modes usable for encoding the current block.

Depending on the embodiment, the processing sequence at the encoder (encoding sequence) may or may not be identical to the processing sequence at the decoder (decoding sequence), provided that the processing sequence is designed so that the encoder and the decoder may process pixel(s) of the same application area for each processed current block.

The video decoder may then be configured for, using the proposed method, autonomously selecting an intra prediction video coding mode, which may then be used for decoding the current block.

The proposed method may therefore be performed autonomously at the encoder and at the decoder, and merely requires that control information indicating that the proposed method has been used by the encoder for a current block be provided to the decoder. The decoder may be configured for, upon receipt of such control information, performing the proposed method for selecting an intra prediction video coding mode to be used for decoding of the current block.

The proposed method may also be viewed and implemented as a new encoding mode, which may be referred to as Derived Intra Mode at Decoder, or as the acronym "DIMD," along other conventional encoding modes, such as, for example, the intra encoding mode, the inter encoding mode, the skip encoding mode, etc.

An encoder configured to use the proposed method for a current block of an image to be encoded, and as a consequence to autonomously select an intra prediction video coding mode for the encoding of the current block, may in some embodiments be further configured to include, in the output bitstream, control data (e.g. a flag) indicating that the DIMD coding mode has been used for encoding the current block. Alternatively, the DIMD coding mode may be defined as an additional intra coding modes (for example, in HEVC, as a 36th intra coding mode), so that the signaling between the encoder and the decoder may be limited to the indicating that the DIMD coding mode has been used for encoding the current block, e.g. through a coding mode index.

An decoder configured to use the proposed method for a current block of an image to be decoded, and as a consequence to autonomously select an intra prediction video coding mode for the decoding of the current block, may in some embodiments be further configured to receive in the encoded bitstream control data indicating that the DIMD coding mode has been used for encoding the current block, and further to the reception of such control data to decode the current block using an intra prediction video coding mode selected according to the present subject disclosure.

In one or more embodiments, the application area may be chosen to be any set of pixels in blocks preceding the current block in the block processing sequence.

As the encoder produces a bit stream, pixels of encoded blocks may refer to pixels that have been encoded (the encoding of which generated bits in the output bit stream of the encoder), and then reconstructed by a decoding performed at the encoder side.

At the encoder, pixels of encoded blocks that have been encoded and then reconstructed may be referred to as "causal" pixels. At the decoder, pixels that have been decoded, that is, reconstructed from a bit stream generated by the encoding, may also be referred to as "causal pixels."

In each case (encoding or decoding), causal pixels may correspond to pixels in blocks preceding the current block in the block processing (encoding or decoding) sequence. At the encoder, each causal pixel may correspond to a pixel in the original image which belongs to a block preceding the current block in the encoding sequence.

In one or more embodiments, the application area may be any set of causal pixels, or when considering a so-called "causal area" comprising causal pixels (e.g. all causal pixels)j, any subset of the causal area. At the encoder, the causal area may comprise any causal pixel, that is, any pixel which has been encoded to produce bitstream data and then reconstructed at the encoder (e.g. through a decoding performed at the encoder).

For example, in some embodiments, at the encoder side, the application area may comprise pixels that have already been processed by the encoder, that is, encoded and then reconstructed (for the encoding of pixels following the encoded pixels according to an encoding sequence). At the decoder side, the application area may comprise pixels that have been reconstructed by the decoder.

At the encoder, the block processing sequence may correspond to the block encoding sequence, that is, the sequence in which the pixel blocks dividing the image to be encoded, are encoded.

At the decoder, the block processing sequence may correspond to the block decoding sequence, that is, the sequence in which the pixel blocks dividing the image to be decoded, are decoded.

As discussed above, in some embodiments the block encoding sequence and the block decoding sequence may not be identical, and if different may be designed so that they lead to the same application area for each current block of the sequences.

In some embodiments, information on the partitioning of the image to be encoded into blocks is included in the bitstream output by the encoder, so that the same partitioning of the image may be used at the decoder for decoding the image. Likewise, information on the block encoding sequence may be included in the bitstream output by the encoder, so that the same sequence may be used at the decoder for decoding the blocks.

In such embodiments, the application area may be defined at the decoder with pixels of the original image (to be encoded), yet chosen so that they correspond to pixels which will have been decoded (reconstructed) at the encoder upon decoding of the current block.

In embodiments where the processing sequence for encoding the blocks is identical to the processing sequence for decoding the encoded blocks, any pixel reconstructed after encoding and corresponding to a pixel of the original image belonging to a block preceding a current block to be encoded will correspond to a pixel already decoded when the decoding of the corresponding current block is performed at the decoder.

Figure 4A:
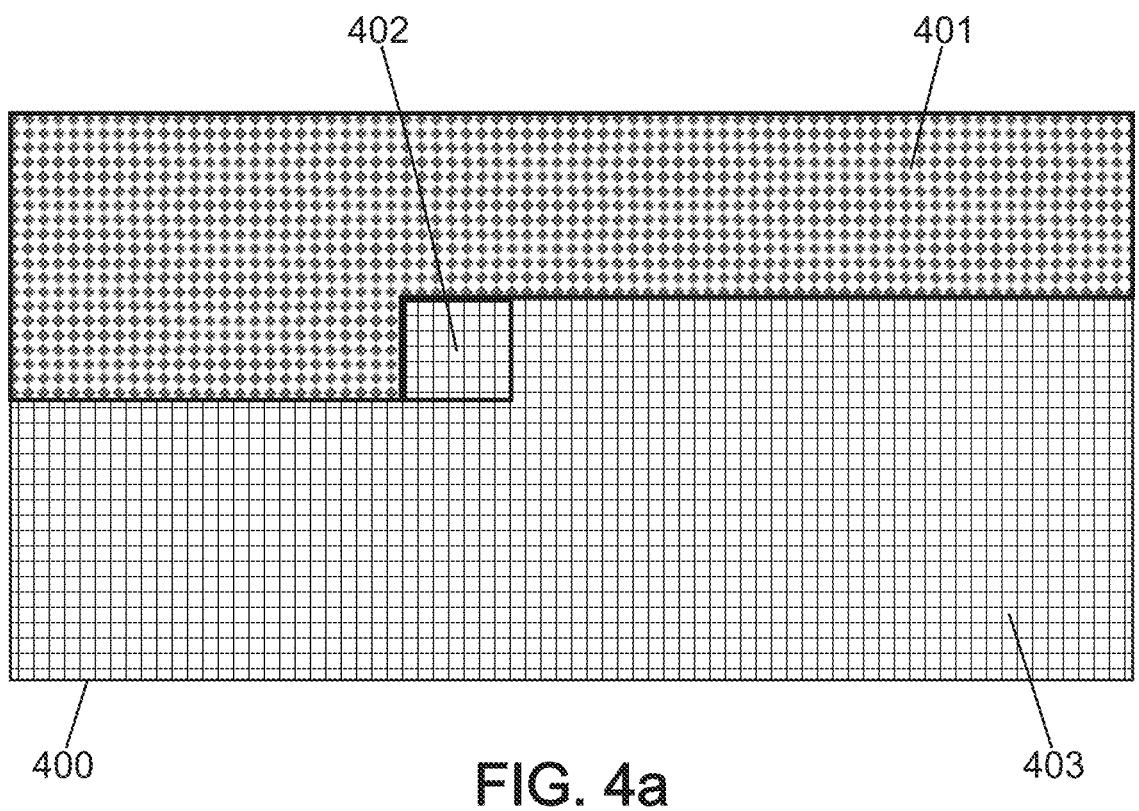
FIGS. 4*a*-4*d* illustrate exemplary application areas in accordance with one or more embodiments.

FIG. 4a illustrates an exemplary causal area, that is, an exemplary set of causal pixels (401) for an image (400), which corresponds to a current block (402) being encoded or decoded, for a raster scan type encoding/decoding sequence.

The pixels located in the third area (403) of the image are non-causal, and may preferably not be used in the implementation of the proposed method. Indeed, at the decoder side, these pixels will not have been decoded when the decoding of the current block (402) is undertaken.

In one or more embodiments, any subset of the set of causal pixels may be determined to be the application area on which a gradient analysis is performed.

Figure 4B:
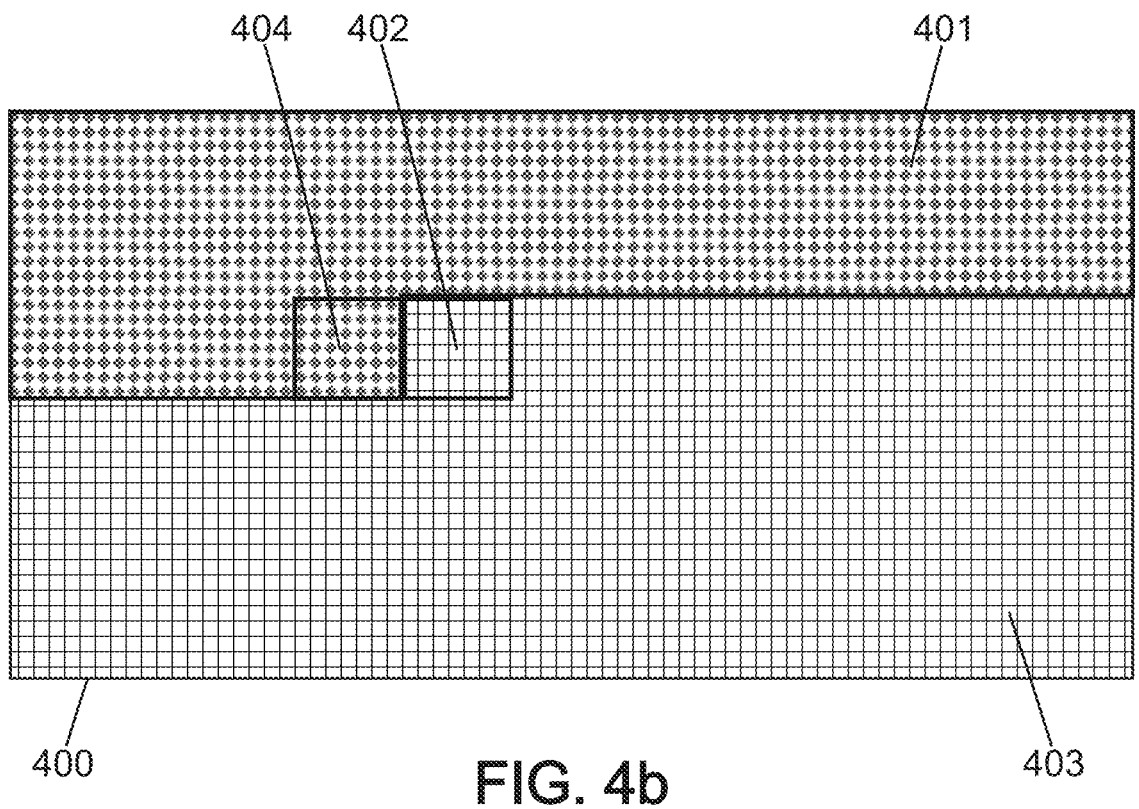
Figure 4C:
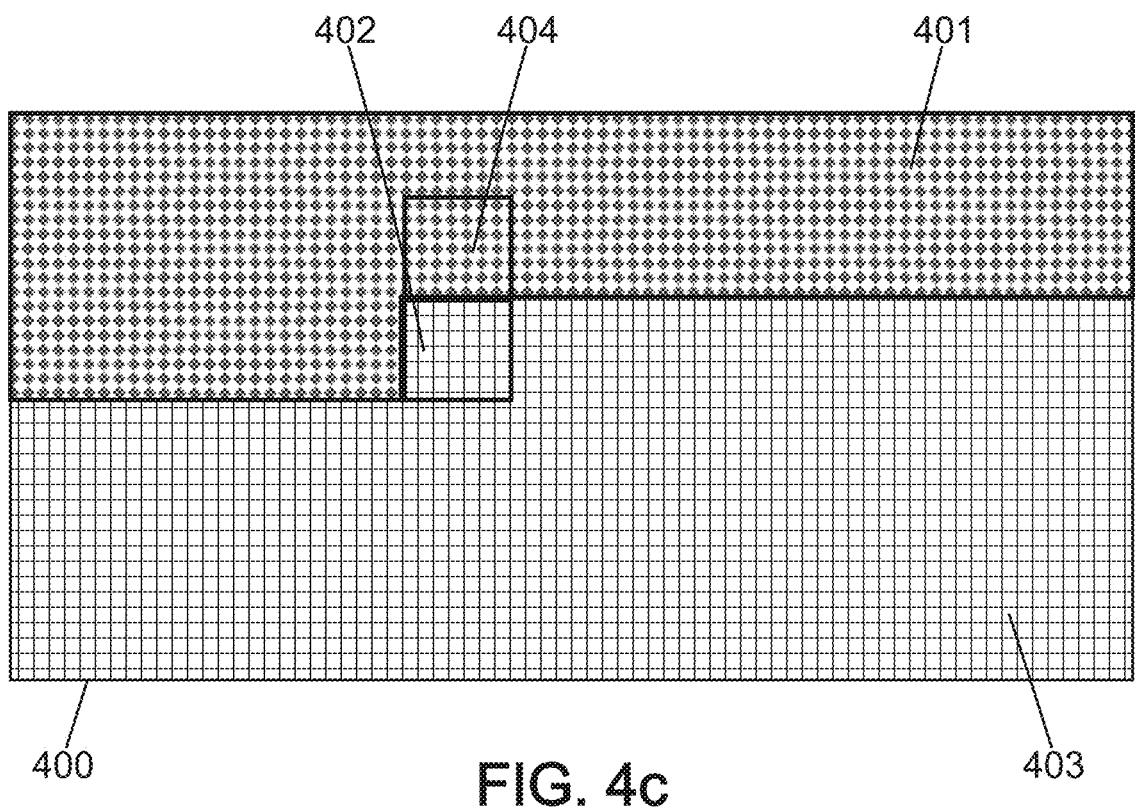
Figure 4D:
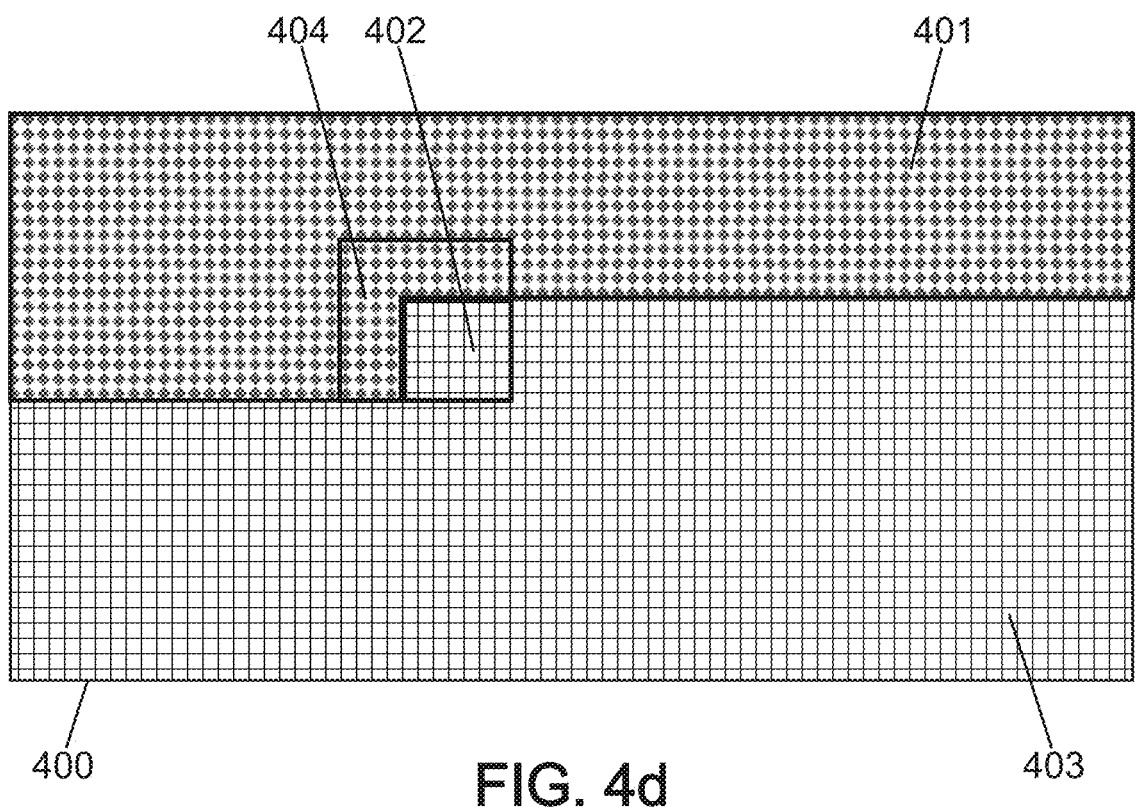

FIGS. 4b, 4c and 4d illustrate different examples of application areas (404b, 404c, 404d) determined as subsets of the causal area (401) of FIG. 4a.

The application area (404b) shown on FIG. 4b is a square-shaped set of pixels located on the left of the current block in the causal area (401).

The application area (404c) shown on FIG. 4c is a square-shaped set of pixels located above the current block in the causal area (401).

The application area (404d) shown on FIG. 4d is a L-shaped set of pixels located on the left of and above the current block in the causal area (401).

In some embodiments, a video encoder and video decoder implementing the proposed method may be configured so that the application area determined at an encoding side is identical to the application area determined at the corresponding decoding side, for each coding block of respective processing sequences.

The determining of the application area may comprise determining a shape and a size of the set of pixels belonging to one or more blocks preceding the current block in the block processing sequence.

Depending on the embodiment, a size (in number of pixels) and/or shape of the application area may be determined based on the type of gradient analysis to be performed on the application area. In some embodiments, a minimum size (that is, a minimum number of pixels) of the application area, or of sections or dimensions of the application area may be determined based on the type of gradient analysis to be performed on the application area. For example, in embodiments wherein the gradient analysis is performed using a 3×3 Sobel filter matrix, the application area will be chosen to have a width of at least 2 pixels in its different parts or sections. As another example, a width (in pixels) of the application area, or sections thereof, may be chosen based on the dimensions of a filter matrix to be used for the gradient analysis.

As a gradient analysis will be performed on the application area, the size of the application area may preferably be determined as a compromise between obtained performances (in particular coding efficiency performances) and computation complexity.

In some embodiments, the shape of the application area may be determined so that the application area does not include any disjoint set of pixels. That is, the pixels of the application area may be determined so that, except for the edge pixels (pixels located at an edge of the application area), any pixel of the application area has at least two adjacent pixels that also belong to the application area.

In other embodiments, the application area may comprise several disjoints sets of pixels. For example, the application area may be determined to be substantially L-shaped around a current block, yet without any pixels surrounding the corner of the current block. In such case, the application area may comprise two disjoint strips of pixels, for example a horizontal strip and a vertical strip, with no pixel belonging to both strips.

Hereinafter, the computation of a gradient for each pixel of the application area according to embodiments of the present subject disclosure is described in further details.

In some embodiments, the computation of a gradient at a given pixel may comprise the computation of a gradient of the intensity of the pixel, that is, of the luma value at the pixel. Such gradient provides an estimate of a direction of the greatest variation from light to dark, and of a change rate in the estimated direction. A gradient analysis performed on pixels of an image can therefore identify the points of the image where the luminosity suddenly changes, which points may be viewed as edges, and provide an estimate of an orientation of those detected edges.

A gradient analysis is typically used in image processing to characterize changes in the intensity of luma values of pixels of an image, to calculate a direction and a magnitude of such a change for a given pixel. A gradient analysis may for example be performed as part of an edge detection analysis to determine a principal angular direction for an analyzed portion of the image.

Various approaches that may be used depending on the embodiment for estimating a principal angular direction (that is, an orientation) at any given point are described below.

Edge detection methods based on derivatives have been developed, some of which generate an image gradient, on which edges present on the original image are emphasized, based on the convolving of the analyzed image portion with a filter. The filter may be a Finite Impulse Response (FIR) filter (e.g. the FIR filters proposed by Sobel or Prewitt), or an Infinite Impulse Response (IIR) filter (e.g. IIR filters based on Gaussian derivatives).

The principal angular direction estimation provided by these methods is however not optimized, as a precise estimation cannot be obtained in each point of an analyzed image portion. For example, errors can be generated for points located in the neighborhood of local extrema points, which are points the gradient is near zero and its orientation indefinite.

Other approaches, based on the use of oriented filter banks, e.g. Gabor filters, Steerable filters, may also be used, even though they are typically used for computing estimations of multiple orientations.

Orientation tensors, or structure tensors, may also be used, even though these approaches calculate spatial statistics on local gradients, which makes them somewhat unfit for the estimation of local orientation, that is, the estimation of an orientation at a given point of the image.

The gradient of a two-variable function (e.g., the image intensity function) at each image point may be computed as a two-dimensional vector, with components calculated by the derivatives in the horizontal and vertical directions. At each image point, the gradient vector points in the direction of largest possible intensity increase, and the magnitude of the gradient vector corresponds to the rate of change in that direction. The gradient is therefore zero in an area where the luma intensity is constant.

As the intensity of pixels of a digital image is a discrete function of the pixel coordinates in the pixel matrix representing the image, derivatives of such a discrete function may only be defined under an assumption that the pixels of the image (values of the discrete function) are samples of a continuous intensity function for the image which has been sampled.

In one or more embodiments, a gradient operator which uses convolution matrices may be used for the computation of the gradient. The convolution matrix may be convolved with the image for the calculation of approximate derivatives in the horizontal and vertical directions. In such embodiments, the computing the gradient may comprise the generating respective estimates of derivatives of an intensity level at the pixel in the horizontal and vertical directions by performing a convolution of a source matrix of pixels of the image with horizontal and vertical filter matrices, respectively.

For example, for a given source image A, represented by a matrix MA, two matrices MGx and MGy may be obtained based on convolutions of the matrix A with two filter matrices Mx and My, respectively corresponding to the horizontal and vertical directions. The matrices MGx and MGy may be viewed as respectively representing two images Gx and Gy, each point of which representing estimates of horizontal and vertical derivatives at the corresponding point of the image A, that is, approximate horizontal and vertical gradients (which may be viewed as approximate horizontal component and vertical component of the gradient vector) at the point:

$MGx=Mx*MA$ for the horizontal direction, and $MGy=My*MA$ for the vertical direction, where the operator * designates a matrix convolution operator.

If MA is an M×N matrix, and Mx and My are square T×T matrices (with T<M and T<N), the matrices MGx and MGy will be (M−T)×(N−T) matrices.

For each point of the image A, the generated horizontal MGx and vertical MGy gradient components can be combined to compute a first gradient value G corresponding to a norm of the gradient vector at the point, and a second gradient value θ corresponding to a direction of the gradient vector at the point, as follows:

$$G = \sqrt{MGx^2 + MGy^2}, \text{ and } \theta = \operatorname{atan}\left(\frac{Gy}{Gx}\right)$$

where a tan is the arc tangent function.

In some embodiments, the first gradient value G may be used as representing an estimate magnitude of the directional change of the intensity at the point, while the second gradient value θ may be used as representing an estimate orientation of the directional change of the intensity at the pixel.

It will be appreciated by those having ordinary skill in the relevant art that any suitable method for computing a gradient representing a directional change of an intensity at a pixel of the image, such as, for example, edge detection methods, orientation tensor methods, filter bank methods, may be used in place of the above-described convolution matrix method which is given by way of example only.

In one or more embodiments, the gradient computed for a pixel of the application area may be mapped to an intra prediction mode among the plurality of intra prediction video coding modes usable, at the encoder, for encoding the current block, or, at the decoder, for decoding the current block.

In some embodiments, the second gradient value computed for a pixel of the application area, which represents an estimate orientation of the directional change of the intensity at the pixel, may be used to perform this mapping, by mapping this second gradient value to a directional intra prediction mode among the plurality of intra prediction video coding modes usable for encoding or decoding the current block.

In one or more embodiments, the mapping may be performed according to the following formula, in the exemplary case of an HEVC encoder:

$$M = \frac{33 \times (\theta - 0.75\pi)}{\pi} + 2$$

where θ is the second gradient value, and M is the intra prediction mode, among the 35 HEVC intra prediction modes, mapped with the value θ.

More generally, the mapping may be performed according to the following formula, where N is the number of intra prediction modes available at the encoder for encoding the input video data:

$$M = \frac{(N-2) \times (\theta - 0.75\pi)}{\pi} + 2$$

For example, in the case of the VVC standard for which 67 intra prediction modes are currently being considered, the mapping may be performed according to the following:

$$M = \frac{65 \times (\theta - 0.75\pi)}{\pi} + 2$$

In one or more embodiments, the selecting of the intra prediction video coding mode may further comprise the determining of respective weight values for several intra prediction modes among the plurality of intra prediction video coding modes, based on gradients computed for pixels of the application area. Depending on the embodiment, respective weight values may be determined for each of the plurality of intra prediction video coding modes available at the encoder and at the decoder.

In some embodiments, the above-described mapping of each computed gradient with an intra prediction mode may be used for determining the weight value associated with the intra prediction mode. That is, the weight value for an intra prediction video coding mode may be determined based on the one or more computer gradient mapped to the intra prediction video coding mode.

For example, the direction information obtained for each pixel of the application area through computation of the gradient may advantageously be used for the determination of the weights of intra prediction video coding modes via the mapping of computed second gradient values with intra prediction video coding modes.

In some embodiments, the weight value for an intra prediction video coding mode may be determined by combining respective first gradient values of computed gradients mapped to the intra prediction video coding mode. The mapping based on second gradient values of such computed gradients may for example be used.

For example, in some embodiments the first gradient values of computed gradients for which the respective second gradient values have been mapped to the same intra prediction video coding mode may be combined (e.g. summed) to obtain a weight value for that intra prediction video coding mode. In such cases, Since second gradient values may be used to associate a computed gradient with a directional intra prediction video coding mode, non-directional intra prediction video coding modes may have a zero weight.

Once weight values have been determined for several intra prediction video coding mode, a set of selectable intra prediction video coding modes may in some embodiments be defined as comprising the intra prediction video coding modes for which a weight value has been determined, or in other embodiments be defined as comprising only the intra prediction video coding modes for which a non-zero weight value has been determined. Depending on the embodiment, the set of selectable intra modes may comprise all of the intra prediction video coding modes usable for encoding and/or decoding the current block, or only a subset thereof.

In one or more embodiments, an intra prediction video coding mode may be selected in the set of selectable intra prediction video coding modes based on the respective weight values of the intra prediction video coding modes of the set.

Any selection criterion for selection of an intra prediction video coding mode among the selectable intra prediction video coding modes that leads to the same selection result, whether the selection is performed at the encoder on the original image or at the decoder an a reconstructed image, may be used for performing the selection.

For example, a selection criterion according to which the intra prediction video coding mode with the greatest weight is selected may be used in some embodiments.

This selection criterion may also be refined in some embodiments with additional conditions to be met for fulfilling the criterion. In the case where no intra prediction mode available at the encoder satisfies the criterion, a default selection can be used to select a predetermined intra prediction mode (e.g. the DC intra prediction mode described above).

In one or more embodiments, a weight value histogram may be generated for purposes of selecting an intra prediction video coding mode, based on the gradient computed for each pixel of the application area.

Figure 5:
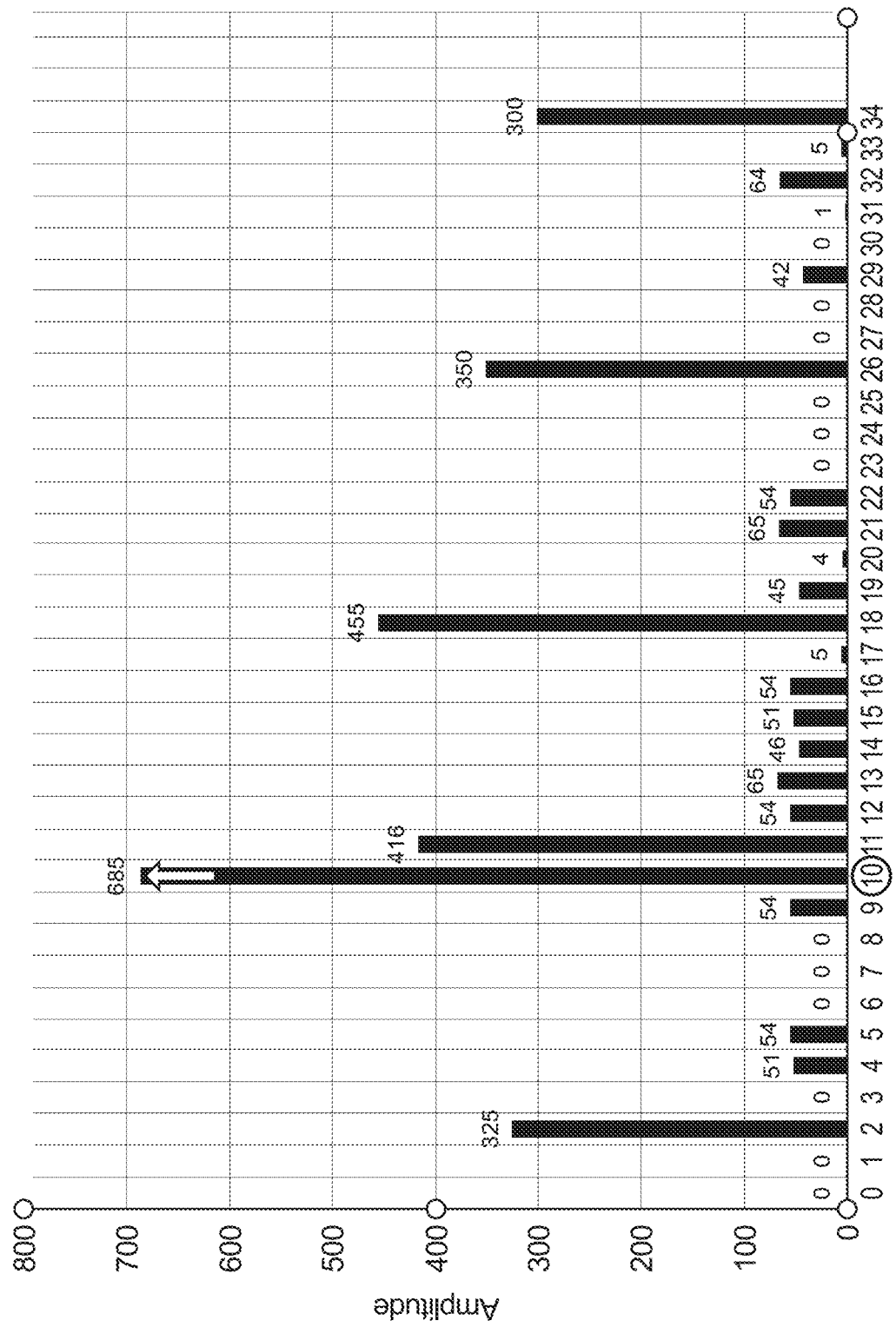
FIG. 5 shows a histogram of intra prediction video coding modes in accordance with one or more embodiments.

For example, such histogram may comprise the weight value calculated for each intra prediction video coding mode, as illustrated on FIG. 5 in the case of an HEVC codec.

In some embodiments, for each pixel of the application area, a first gradient value representing an estimate magnitude of the directional change of the intensity at the pixel, and a second gradient value representing an estimate orientation of the directional change of the intensity at the pixel may be computed as part of the computation of a gradient for the pixel. The second gradient value may be used to map the computed gradient to an intra prediction video coding mode. That is, the second gradient value may be used to identify an intra prediction video coding mode corresponding to the computed gradient.

For each intra prediction video coding mode, a weight value is calculated by combining the first gradient values of the computed gradients mapped to the intra prediction video coding mode. In embodiments where the first gradient values are added to each other, the resulting weight value of the intra prediction video coding mode is increased with the first gradient value of each computed gradient mapped to the intra prediction video coding mode.

Once all the pixels of the application area have been processed according to the proposed method, and given that the weighting of intra prediction video coding modes is cumulative, a histogram of weight values for the corresponding intra prediction video coding modes provides an efficient way to select an intra prediction video coding mode that is representative of the entire current block. As a result, the intra prediction video coding mode selected according to the proposed method may be used for the prediction encoding of all the pixels of the current block.

Figure 6A:
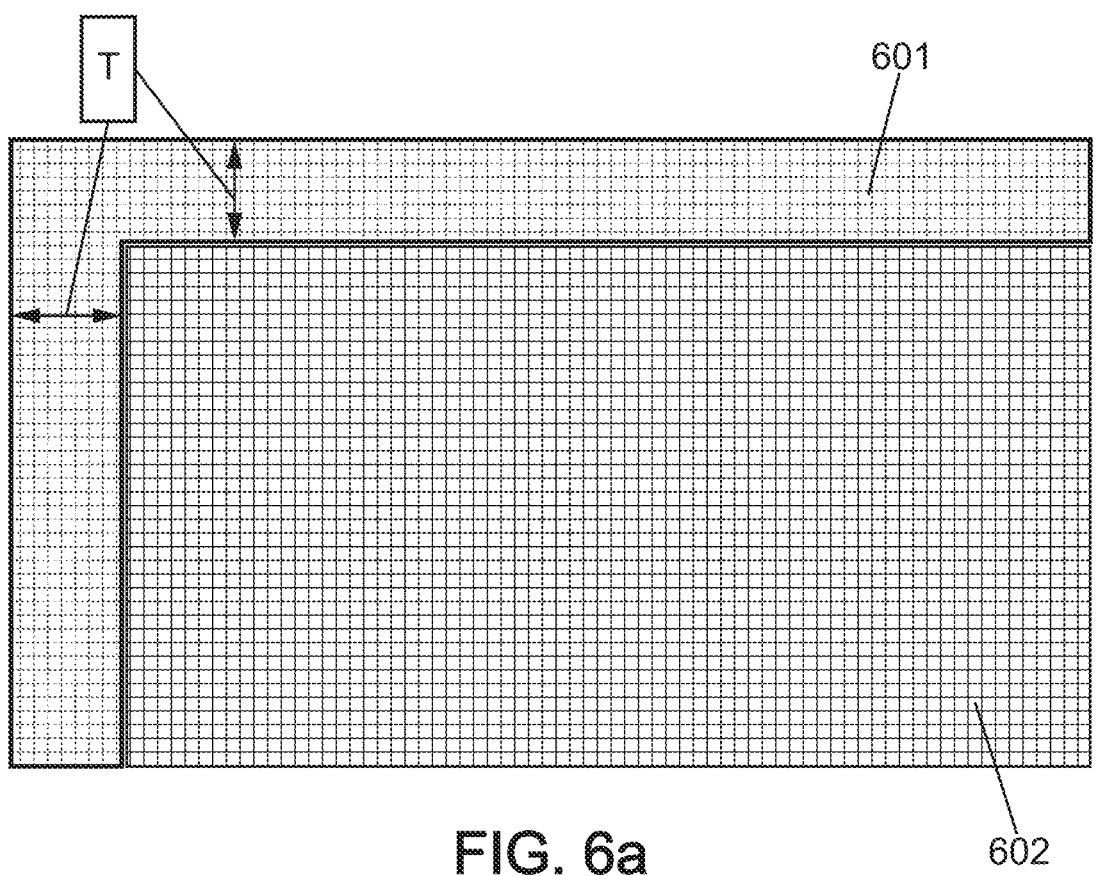
FIGS. 6*a* and 6*b* respectively illustrate an application area and the calculation of a gradient for a pixel of the application area.
Figure 6B:
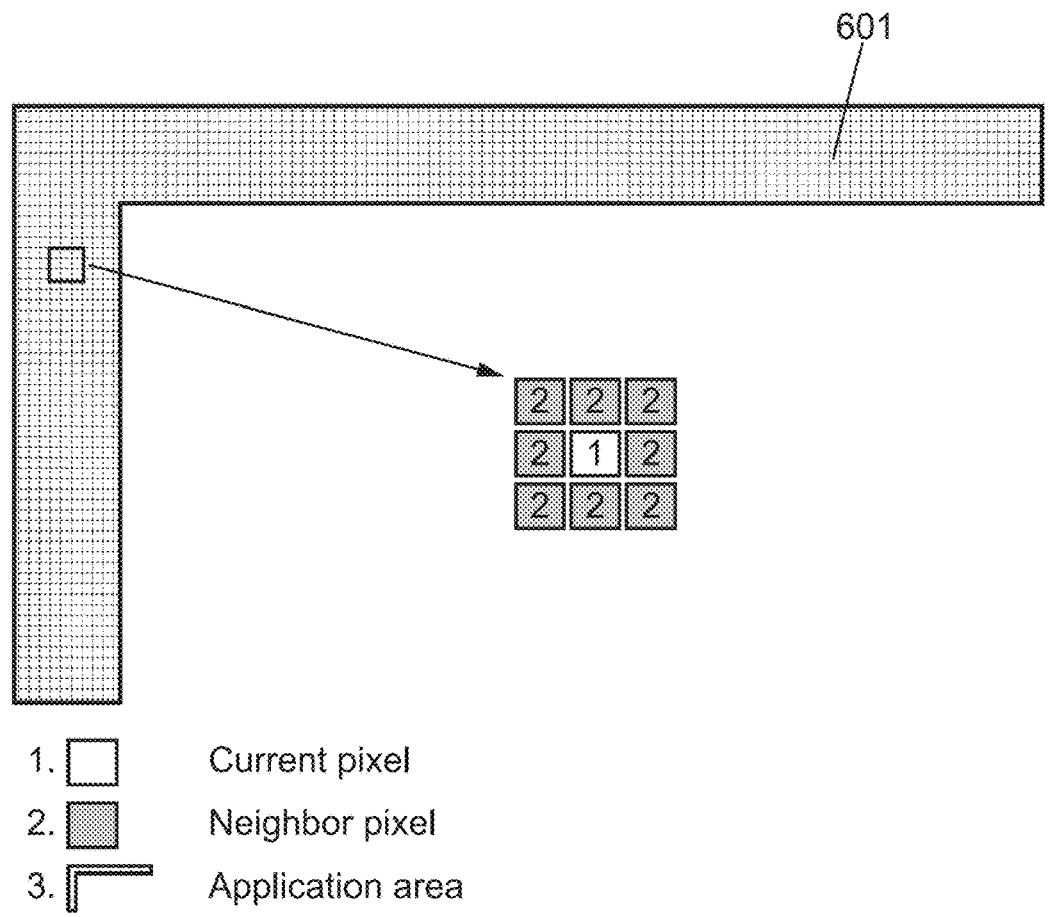

Hereinafter an exemplary embodiment of the proposed method is described as illustrated on FIGS. 6*a* and 6*b*.

In this exemplary embodiment, an application area (601) is determined as a set of pixels located on the left and above the current block (602). In this example, the application area surrounds the current block with a T-pixels wide band along the left side of the current block (602), and a T-pixel wide band along the upper side of the current block (602).

For example, the T parameter may be chosen equal to 2, 4, or 8. The value T=2 offers a good compromise between coding efficiency and additional computation complexity at the decoder. Note that the increase of computational complexity is a more salient concern at the decoder side, because a decoder would have to support the DIMD mode as long as it is configured to decode any bit stream that is output by an encoder which may have used the DIMD mode to encode input video data. At the encoder side, it may be chosen to not use the DIMD mode.

The gradient analysis performed on this application area may use a Sobel filter of size 3×3, which provides good results in view of the simplicity of its implementation.

The computation of the intensity gradient for a pixel of the application area may be performed based on the following two filter matrices Mx and My respectively corresponding to the horizontal and vertical directions:

$$Mx = \begin{bmatrix} -1 & 0 & 1 \\ -2 & 0 & 2 \\ -1 & 0 & 1 \end{bmatrix} \text{ and}$$

$$My = \begin{bmatrix} -1 & -2 & 1 \\ 0 & 0 & 0 \\ 1 & 2 & 1 \end{bmatrix}$$

As described above, for a given source image A, represented by a matrix MA, two matrices MGx and MGy may be obtained based on convolutions of the matrix A with Mx and My, as follows:

$$MGx = Mx * MA \text{ and } MGy = My * MA$$

Hereinafter is provided an numerical example of calculation of the MGx and MGy matrices.

Let MA be the following matrix.

$$MA = \begin{bmatrix} 15 & 12 & 65 & 94 \\ 30 & 20 & 29 & 27 \\ 10 & 20 & 6 & 3 \\ 20 & 20 & 40 & 49 \end{bmatrix}$$

And let Mx and My be the 3×3 Sobel matrices described above. In that case, MGx and MGy will be:

$$MGx = \begin{bmatrix} -15 - 30 \times 2 - 10 + & -12 - 20 \times 2 - 20 + \\ 65 + 29 \times 2 + 6 & 94 + 27 \times 2 + 3 \\ -30 - 10 \times 2 - 20 + & -20 - 20 \times 2 - 20 + \\ 29 + 6 \times 2 + 40 & 27 + 3 \times 2 + 49 \end{bmatrix}$$

$$MGx = \begin{bmatrix} 44 & 79 \\ 11 & 2 \end{bmatrix}$$

$$MGy = \begin{bmatrix} -15 - 12 \times 2 - 65 + & -12 - 65 \times 2 - 94 + \\ 10 + 20 \times 2 + 6 & 20 + 6 \times 2 + 3 \\ -30 - 20 \times 2 - 29 + & -20 - 29 \times 2 - 27 + \\ 20 + 20 \times 2 + 40 & 20 + 40 \times 2 + 49 \end{bmatrix}$$

$$MGy = \begin{bmatrix} -48 & -201 \\ 1 & 44 \end{bmatrix}$$

The Sobel filter is advantageous in that it only uses, for the calculation of a gradient at a given point, 3×3 neighbor pixels located around said given point. In addition, the numbers used for the calculation of the gradient are integers. As a consequence, this filter can be implemented in software as well as in hardware. Only 8 points located around the point for which the gradient is calculated are used for the calculation of the gradient, as illustrated on FIG. 6*b*, which shows 8 neighbor pixels located around a current pixel for which a gradient computation is performed.

An intra prediction video coding mode can then be selected based on weight values calculated for each available intra prediction video coding modes, for example using a maximum weight criterion as described above.

Figure 7:
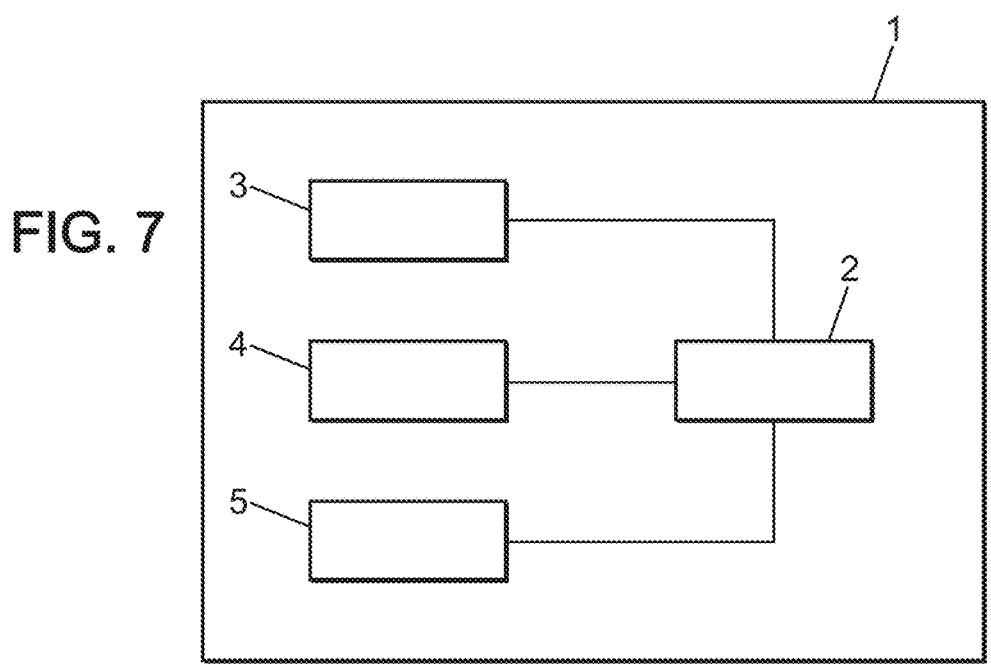
FIG. 7 illustrates an exemplary video encoder and/or decoder according to one or more embodiments.

FIG. 7 illustrates an exemplary video coding and/or decoding apparatus or unit 1 configured to use an image processing feature in accordance with embodiments of the present subject disclosure.

The apparatus 1, which may comprise one or more computers, includes a control engine 2, a video compression engine 3, a data communication engine 4, a memory 5, and a power supply (e.g., a battery, plug-in power supply, etc.) (not represented on the figure). In the architecture illustrated on FIG. 7, all of the video compression engine 3, data communication engine 4, and memory 5 are operatively coupled with one another through the control engine 2.

In one embodiment, the video compression engine 3 is configured to perform various aspects of embodiments of the proposed method for network management as described herein.

In one embodiment, the data communication engine 4 is configured to receive input video data and output an encoded bit stream, and process received input video data in the case of an encoder, and configured to receive an encoded bit stream and output decoded video data, and process received encoded bit stream in the case of a decoder.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage computer storage medium, capable of storing a data structure representing a computer network to which the apparatus 1 belongs, coupled to the control engine 2 and operable with the data communication engine 4 and the video compression engine 3 to facilitate management and processing of video data stored in association therewith.

In embodiments of the present subject disclosure, the apparatus 1 is configured for performing the image processing methods described herein.

It will be appreciated that the apparatus 1 shown and described with reference to FIG. 7 is provided by way of example only. Numerous other architectures, operating environments, and configurations are possible. Other embodiments of the node may include fewer or greater number of components, and may incorporate some or all of the functionality described with respect to the apparatus components shown in FIG. 7. Accordingly, although the control engine 2, video compression engine 3, data communication engine 4, and memory 5 are illustrated as part of the apparatus 1, no restrictions are placed on the location and control of components 2-5. In particular, in other embodiments, components 2-5 may be part of different entities or computing systems.

The proposed method may be used for the processing, for purposes of encoding or compression, or decoding or decompression, of input data which may correspond, depending on the embodiment, to an image, a picture, a video frame, or video data.

While the disclosure has been described with respect to preferred embodiments, those skilled in the art will readily appreciate that various changes and/or modifications can be made to the disclosure without departing from the spirit or scope of the disclosure as defined by the appended claims.

Although this disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method of processing an image divided into a plurality of pixel blocks which are processed according to a processing sequence, the method comprising, for a current pixel block:
    determining an application area comprising a set of pixels in blocks preceding the current block in the processing sequence;
    performing a gradient analysis on at least one pixel of the application area;
    selecting, based on results of the gradient analysis, an intra prediction video coding mode among a plurality of intra prediction video coding modes usable for encoding and/or decoding the current block,
    wherein the performing the gradient analysis comprises: for each of the at least one pixel of the application area, computing a gradient representing a directional change of an intensity at the each of the at least one pixel,
    wherein the selecting the intra prediction video coding mode comprises: for each of the at least one pixel of the application area, mapping the computed gradient to an intra prediction mode among the plurality of intra prediction video coding modes, and
    wherein the selecting the intra prediction video coding mode further comprises: determining respective weight values for several intra prediction modes among the plurality of intra prediction video coding modes, based on gradients computed for pixels of the application area;
    wherein the method is performed by a processor of an image decoder, and further comprising, at the image decoder: decoding, via the processor, the current block according to the selected intra prediction video coding mode.

2. The method according to claim 1, further comprising, at the image decoder: decoding, via the processor, the current block according to the selected intra prediction video coding mode, and wherein the plurality of intra prediction video coding modes is used at the decoder for decoding the current block.

3. The method according to claim 1, wherein the performing the gradient analysis further comprises:
    computing a first gradient value representing an estimate magnitude of the directional change of the intensity at each of the at least one pixel, and
    computing a second gradient value representing an estimate orientation of the directional change of the intensity at each of the at least one pixel.

4. The method according to claim 1, wherein the performing the gradient analysis comprises: generating respective estimates of derivatives of an intensity level at the at least one pixel in the horizontal and vertical directions by performing a convolution of a source matrix of pixels of the image with horizontal and vertical filter matrices, respectively.

5. The method according to claim 1, wherein the performing the gradient analysis further comprises: computing a first gradient value representing an estimate magnitude of the directional change of the intensity at each of the at least one pixel, and a second gradient value representing an estimate orientation of the directional change of the intensity at each of the at least one pixel, and wherein the mapping is performed by mapping the second gradient value to a directional intra prediction mode among the plurality of intra prediction video coding modes.

6. The method according to claim 1, wherein the performing the gradient analysis comprises: for each of the at least one pixel of the application area, computing a gradient representing a directional change of an intensity at the each of the at least one pixel, and wherein the selecting is based on at least one of the computed gradients, wherein the selecting the intra prediction video coding mode comprises: for the each of the at least one pixel of the application area, mapping the computed gradient to an intra prediction mode among the plurality of intra prediction video coding modes, and wherein the weight value for an intra prediction video coding mode is determined based on one or more of the computed gradients mapped to the intra prediction video coding mode.

7. The method according to claim 1, wherein the performing the gradient analysis further comprises: computing a first gradient value representing an estimate magnitude of the directional change of the intensity at the each of the at least one pixel, and a second gradient value representing an estimate orientation of the directional change of the intensity at the each of the at least one pixel, wherein the performing the gradient analysis comprises: for each of the at least one pixel of the application area, computing a gradient representing a directional change of an intensity at the each of the at least one pixel, and wherein the selecting is based on at least one of the computed gradients, wherein the selecting the intra prediction video coding mode comprises: for each of the at least one pixel of the application area, mapping the computed gradient to an intra prediction mode among the plurality of intra prediction video coding modes, and wherein the weight value for an intra prediction video coding mode is determined by combining respective first gradient values of computed gradients mapped to the intra prediction video coding mode.

8. The method according to claim 1, wherein the intra prediction video coding mode is selected based on its weight value.

9. An apparatus, the apparatus comprising a processor and a memory operatively coupled to the processor, wherein the processor is configured to, for a current pixel block of an image divided into a plurality of pixel blocks which are processed according to a processing sequence:
   determine an application area comprising a set of pixels in blocks preceding the current block in the processing sequence;
   perform a gradient analysis on at least one pixel of the application area; and
   select, based on results of the gradient analysis, an intra prediction video coding mode among a plurality of intra prediction video coding modes usable for encoding and/or decoding the current block,
   wherein the performing the gradient analysis comprises: for each of the at least one pixel of the application area, computing a gradient representing a directional change of an intensity at the at least one pixel,
   wherein the selecting the intra prediction video coding mode comprises: for each of the at least one pixel of the application area, mapping the computed gradient to an intra prediction mode among the plurality of intra prediction video coding modes, and
   wherein the selecting the intra prediction video coding mode further comprises: determining respective weight values for several intra prediction modes among the plurality of intra prediction video coding modes, based on gradients computed for pixels of the application area;
   wherein the processor comprises a processor of an image decoder that is further configured to decode the current block according to the selected intra prediction video coding mode.

10. A non-transitory computer-readable medium encoded with executable instructions which, when executed, causes an apparatus comprising a processor operatively coupled with a memory, to perform a method of processing an image divided into a plurality of pixel blocks which are processed according to a processing sequence, the method comprising, for a current pixel block:
    determining an application area comprising a set of pixels in blocks preceding the current block in the processing sequence;
    performing a gradient analysis on at least one pixel of the application area;
    selecting, based on results of the gradient analysis, an intra prediction video coding mode among a plurality of intra prediction video coding modes usable for encoding and/or decoding the current block,
    wherein the performing the gradient analysis comprises: for each of the at least one pixel of the application area, computing a gradient representing a directional change of an intensity at the at least one pixel,
    wherein the selecting the intra prediction video coding mode comprises: for each of the at least one pixel of the application area, mapping the computed gradient to an intra prediction mode among the plurality of intra prediction video coding modes, and
    wherein the selecting the intra prediction video coding mode further comprises: determining respective weight values for several intra prediction modes among the plurality of intra prediction video coding modes, based on gradients computed for pixels of the application area;
    wherein the processor comprises a processor of an image decoder that is further configured to decode the current block according to the selected intra prediction video coding mode.

11. The apparatus according to claim 9, wherein the processor is further configured to compute a first gradient value representing an estimate magnitude of the directional change of the intensity at the at least one pixel, and compute a second gradient value representing an estimate orientation of the directional change of the intensity at the at least one pixel.

12. The apparatus according to claim 9, wherein the processor is further configured to generate respective estimates of derivatives of an intensity level at the at least one pixel in the horizontal and vertical directions by performing a convolution of a source matrix of pixels of the image with horizontal and vertical filter matrices, respectively.

13. The non-transitory computer-readable medium according to claim 10, wherein the performing the gradient analysis further comprises: computing a first gradient value representing an estimate magnitude of the directional change of the intensity at the at least one pixel, and a second gradient value representing an estimate orientation of the directional change of the intensity at the at least one pixel.

14. The apparatus according to claim 9, included in a decoder side, further configured for receiving, from an encoder side, control information indicating that a Derived Intra Mode at Decoder (DIMD) method has been used by the encoder side.

15. The method according to claim 1, implemented at a decoder side, further comprising: receiving, from an encoder side, control information indicating that a Derived Intra Mode at Decoder (DIMD) method has been used by the encoder side.

16. The non-transitory computer-readable medium according to claim 10, wherein the apparatus is included in a decoder side, and is further configured for receiving, from an encoder side, control information indicating that a Derived Intra Mode at Decoder (DIMD) method has been used by the encoder side.

17. The apparatus according to claim 9, wherein the performing the gradient analysis further comprises: computing a first gradient value representing an estimate magnitude of the directional change of the intensity at each of the at least one pixel, and a second gradient value representing an estimate orientation of the directional change of the intensity at each of the at least one pixel, and wherein the mapping is performed by mapping the second gradient value to a directional intra prediction mode among the plurality of intra prediction video coding modes.

18. The non-transitory computer-readable medium according to claim 10, wherein the performing the gradient analysis further comprises: computing a first gradient value representing an estimate magnitude of the directional change of the intensity at each of the at least one pixel, and a second gradient value representing an estimate orientation of the directional change of the intensity at each of the at least one pixel, and wherein the mapping is performed by mapping the second gradient value to a directional intra prediction mode among the plurality of intra prediction video coding modes.

19. The apparatus according to claim 9, wherein the performing the gradient analysis comprises: for each of the at least one pixel of the application area, computing a gradient representing a directional change of an intensity at the each of the at least one pixel, and wherein the selecting is based on at least one of the computed gradients, wherein the selecting the intra prediction video coding mode comprises: for the each of the at least one pixel of the application area, mapping the computed gradient to an intra prediction mode among the plurality of intra prediction video coding modes, and wherein the weight value for an intra prediction video coding mode is determined based on one or more of the computed gradients mapped to the intra prediction video coding mode.

20. The non-transitory computer-readable medium according to claim 10, wherein the performing the gradient analysis comprises: for each of the at least one pixel of the application area, computing a gradient representing a directional change of an intensity at the each of the at least one pixel, and wherein the selecting is based on at least one of the computed gradients, wherein the selecting the intra prediction video coding mode comprises: for the each of the at least one pixel of the application area, mapping the computed gradient to an intra prediction mode among the plurality of intra prediction video coding modes, and wherein the weight value for an intra prediction video coding mode is determined based on one or more of the computed gradients mapped to the intra prediction video coding mode.

\* \* \* \* \*